United States Patent [19]
Takayama et al.

[11] Patent Number: 5,923,033
[45] Date of Patent: *Jul. 13, 1999

[54] INTEGRATED SPM SENSOR HAVING A PHOTODETECTOR MOUNTED ON A PROBE ON A FREE END OF A SUPPORTED CANTILEVER

[75] Inventors: Michio Takayama, Minowamachi; Kazuya Matsumoto, Minamiminowamura; Yoshitaka Kamiya; Mamoru Hasegawa, both of Tatsunomachi, all of Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/528,207

[22] Filed: Sep. 12, 1995

[30] Foreign Application Priority Data

| Sep. 14, 1994 | [JP] | Japan | 6-244864 |
| Oct. 13, 1994 | [JP] | Japan | 6-273065 |
| Nov. 18, 1994 | [JP] | Japan | 6-308436 |

[51] Int. Cl.[6] .................................. G01B 7/34
[52] U.S. Cl. .......................... 250/234; 250/306; 73/105
[58] Field of Search .................................. 250/234, 306, 250/307; 73/105, 862.634

[56] References Cited

U.S. PATENT DOCUMENTS

| 5,272,913 | 12/1993 | Toda et al. . | |
| 5,386,110 | 1/1995 | Toda | 250/306 |
| 5,386,720 | 2/1995 | Toda et al. . | |
| 5,581,083 | 12/1996 | Majumdar et al. | 250/234 |
| 5,583,286 | 12/1996 | Matsuyama | 250/306 |

*Primary Examiner*—Edward P. Westin
*Assistant Examiner*—Kevin Pyo
*Attorney, Agent, or Firm*—Armstrong, Westerman, Harttori, McLeland & Naughton

[57] ABSTRACT

An integrated SPM sensor including a cantilever having a probe on its free end, a supporting base for supporting the cantilever on its fixed end, and signal lines for conducting a signal picked up by the probe. The probe is a photodetector element constructed of any of a junction gate-type photo FET, a Schottky gate-type photo FET, an MOS-type photodiode and a Schottky-type photodiode. The integrated SPM sensor substantially lowers noise due to thermally excited dark current and easily detects weak incident light.

29 Claims, 15 Drawing Sheets

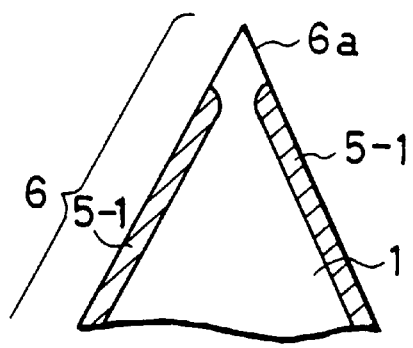
FIG. 16
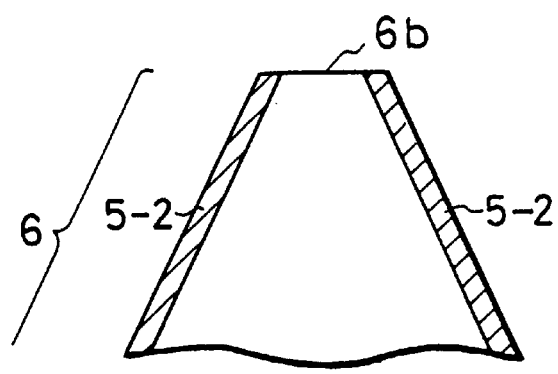
FIG. 17
FIG. 18
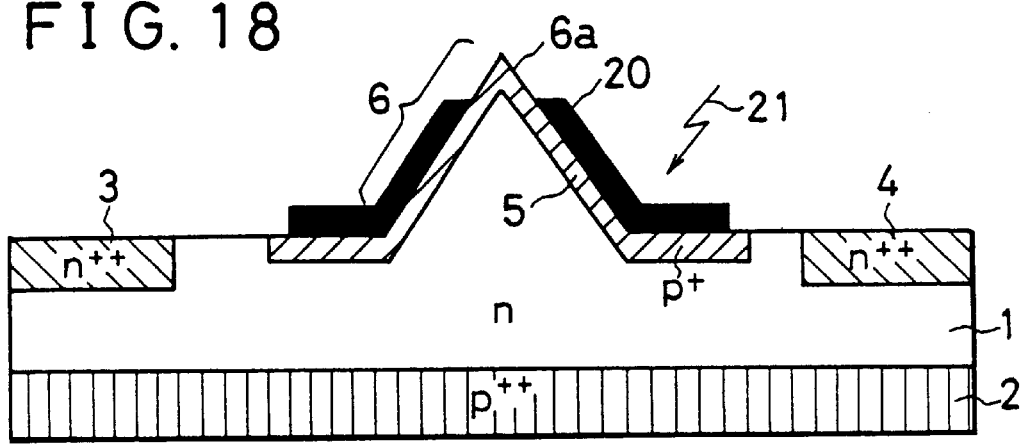

INTEGRATED SPM SENSOR HAVING A PHOTODETECTOR MOUNTED ON A PROBE ON A FREE END OF A SUPPORTED CANTILEVER

BACKGROUND OF THE INVENTION

1. Field of the Invention

The present invention relates to an integrated scanning probe microscope sensor (hereinafter referred to as SPM sensor) for use in a scanning probe microscope.

2. Description of the Related Art

Optical microscopes, which achieve a high resolving power in excess of diffraction limited to one using an evanescent wave, have been proposed since the 1980s. Such a microscope is called a scanning near field optical microscope (hereinafter referred to as SNOM). The SNOM is classified as an SPM, as are the scanning tunneling microscope (hereinafter referred to as STM) and the atomic force microscope (hereinafter referred to as AFM). The SNOM makes use of the phenomenon that the evanescent wave is confined to a localized region which is less than its wavelength and is unable to propagate in free space.

The principle of measurement in SNOM is as follows: a probe of the microscope is placed in a close vicinity of the surface of a sample to be measure by a distance of no more than one wavelength; and the intensity of light that passes by the miniature slit at the tip of the probe is mapped to form an image of the sample. Although several methods to implement SNOM have been proposed, they are divided into two main methods. One is called a collection method, in which light is directed from below the sample, and to form an SNOM image, a probe is used to pick up the evanescent wave that is transmitted through the sample and localized in the vicinity of the surface of the sample. The other is called an emission method, in which a probe having a miniature slit projects light to a sample, and the light transmitted through the sample is picked up by a photodetector device mounted below the sample. This method has been disclosed, for example, in Japanese Patent Application Laid-open No. Hei-4-291310 (AT&T; R. E. Betzig).

A typical SNOM apparatus is now discussed. A sample to be measured is placed on top of an inverted prism on a three-dimensionally movable stage. A semiconductor generated laser beam irradiates the sample bearing surface of the prism at an angle that satisfies total reflection conditions. As a result, evanescent light is generated in the vicinity of the surface of the sample. When a fiber-optic probe having a sharpened tip is placed close to the surface of the sample to be measured, evanescent light is converted into scattering light. Scattering light is guided via the fiber-optic probe to a photodetector device, which then detects a change in the intensity of scattering light. The change in the intensity of scattering light detected by the photodetector device is converted to corresponding scattering light intensity signal, which is then output to a Z position control mechanism. In response to the scattering light intensity signal, the Z position control mechanism controls the three-dimensionally movable stage to move it in the Z direction, and holds the sample and the tip of the fiber-optic probe in approximately the same position.

In the above test setup, a microcomputer controls the three-dimensionally moving state to move it in the XY plane according to the XY scanning mechanism. The fiber-optic probe thus scans relatively the sample in XY plane. Evanescent light generated in the vicinity of the surface of the sample is picked up the fiber-optic probe, which in turn converts evanescent light into scattering light. Scattering light is converted by the photodetector device into an electrical signal that represents the intensity of light. The electrical signal is subjected to image processing such as noise elimination and background cutting, and then is displayed as an SNOM image.

The design of such an SNOM probing apparatus is discussed referring to FIGS. 1A and 1B. The probing apparatus in FIGS. 1A and 1B has been presented in the Papers for the 55th Conference of the Applied Physics Society of Japan (Vol. 2, P457, autumn of 1994). FIGS. 1A and 1B are plan and cross-sectional views showing the probing apparatus. In FIGS. 1A and 1B, a cantilever portion 101, made up of a supporting base 102 and a lever 103, is constructed of a p-type silicon substrate. Also shown are an n-type diffusion layer 104 formed on the tip of the lever 103 that is constructed of the p-type silicon substrate, an n+ diffusion layer 105 for establishing an ohmic contact with a signal line, a p+ diffusion layer 106 for establishing an ohmic contact with a signal line, the signal line 107 connected to the n+ diffusion layer 105, and the signal line 108 connected to the p+ diffusion layer 106. Designated 109 is a photodiode region constructed of the n-type diffusion layer 104 and the p-type silicon substrate that forms the lever 103.

The operation of the SNOM probe thus constructed is now discussed. The signal line 108 is supplied with a negative voltage relative to the signal line 107. This negative voltage reverse biases the junction between the n-type diffusion layer 104 in the photodiode region 109 and the p-type silicon substrate forming the lever 103. A depletion layer is thus generated in and near the junction, and thus the junction is put into a depletion state. When incident light such as evanescent light enters the photodiode region 109 in this state, hole-electron pairs are generated in and near the depletion layer. The optical-signal signal current resulting from the generation is then picked up via the signal lines 107, 108, and the sensing of the optical signal is thus possible.

As a microscope that allows one to observe with the accuracy to the size of atoms a dielectric sample that typically presents measurement difficulties with STM, AFM has been proposed (Japanese Patent Application Laid-open No. Sho-62-130302: IBM, G. Binnig, method and apparatus for image forming of the surface of a sample).

The design of this AFM is similar to that of STM, and thus the AFM is categorized as a type of SPM. In AFM, a cantilever having on its free end a sharp tip (probe) is placed close to a sample, and the motion of the cantilever that is displaced by an interactive force working between the atoms of the probe tip and the atoms of the sample is electrically or optically measured. While the sample is scanned in the XY plane, the irregularity of the sample is thus three-dimensionally captured by allowing the probe tip of the cantilever to move relative to the sample.

In this AFM, the displacement measuring sensor for measuring the displacement of the cantilever is typically separately devised. Recently, however, M. Tortonese et al. have proposed an integrated AFM sensor in which the function of displacement measurement is implemented into the structure of a cantilever. Such an integrated AFM sensor is disclosed, for example, by M. Tortonese, H. Yamada., R. C. Barrett and C. F. Quate in a paper entitled "Atomic force microscopy using a piezoresistive cantilever" (Transducers and Sensors '91) and in PCT Patent Application WO92/12398.

In the SNOM probing apparatus as shown in FIGS. 1A and 1B, the cantilever 101 is constructed of the p-type silicon substrate. The area where the p-type substrate is exposed, for example, the exposed surface 110 of FIG. 1B is shown in an enlarged view in FIG. 2. In FIG. 2, the exposed surface 110 of the p-type silicon substrate has a natural oxide layer ($SiO_2$ layer) 111 having a thickness ranging from a several Å to tens of Å. Positive interface charge 113 at a density of $10^{10}$ to $10^{12} cm^{-2}$ exists in the natural oxide layer 111 or Si—$SiO_2$ interface 112. The presence of the positive interface charge 113 induces an electron inversion layer 114 or an acceptor depletion layer 115 on the surface of the lever 103 of the p-type silicon substrate.

In the above state, hole-electron pairs are generated by thermal excitation in the interfacial level existing in the Si—$SiO_2$ interface 112, or in the acceptor depletion layer 115 in which the generation-recombination center exists. The hole-electron pairs are noise detrimental to optical signal. For example, holes generated in the exposed layer 110 flow to the signal line 108 via the p+ diffusion layer 106. Electrons flow to the signal line 107 via the n+ diffusion layer 105. They are superimposed on the optical signal as noise. As seen from FIGS. 1A and 1B, in the known SNOM probing apparatus, the cantilever portion 101 is constructed of p-type silicon substrate, and the majority of the surface of the cantilever 101 work as a dark current generation region. A great deal of dark current is thus generated, severely degrading the S/N ratio in the signal detected by the photodiode.

The integrated AFM sensor disclosed by M. Tortonese et al. is a cantilever into which a strain sensor is integrated. A cantilever integrated with sensor having photodetecting capability may be easily contemplated. If a sensor having photodetecting capability, such as a photodiode, is simply integrated into a cantilever, however, photo-carriers arising from exposure to light irradiation may recombine with carriers in the semiconductor, or may be captured by traps in the semiconductor. Photo-carriers therefore fail to contribute as photocurrents, lowering sensing efficiency. A feeble light, such as evanescent light, exists only in the vicinity of the surface of the sample and is unable to reach the depletion layer. Photo-carriers generated will immediately recombine in the semiconductor, and the sensitivity of the sensor is thus lowered.

In an SNOM apparatus having a known fiber-optic probe, a separate sensor is mounted external to the probe, causing its design to be bulky. Such a bulky design not only exposes the SNOM apparatus to ambient vibrations and shocks, but also presents manufacturing difficulty. Since the probe is separated from the photodetecting mechanism, light suffers a loss therebetween. Photodetecting efficiency, namely, sensitivity is thus degraded. The prior art SNOM apparatus is totally different in system configuration from SPM apparatuses and AFM apparatuses in particular. Therefore, many users are obliged to purchase a dedicated SNOM apparatus besides an AFM apparatus. This means a substantial increase in expenditure to the users.

SUMMARY OF THE INVENTION

The present invention has been developed in view of the above problems associated with the known integrated AFM sensor or SNOM apparatus. It is a first object of the present invention to provide an integrated SPM sensor that has an excellent sensitivity and allows a compact design to be implemented into its host apparatus. It is a second object of the present invention to provide an integrated SPM sensor equipped with a photodetector element that has a high sensitivity sufficient enough to pick up a extremely weak incident light. It is a third object of the present invention to provide a structure of the photodetector element in the integrated SPM sensor in which the element structure offers even more high sensitivity characteristics. It is a fourth object of the present invention to provide an integrated SPM sensor which substantially reduces noise generated by thermally-excited dark current.

To achieve the first and second objects, the integrated SPM sensor according to the present invention comprises a cantilever having a probe on its free end, a supporting base for supporting the fixed end of the cantilever, and signal lines for conducting a signal picked up by the probe, wherein the probe is a photodetector element constructed of any of a junction gate-type photo FET (Field Effect Transistor), a Schottky gate type photo FET, an MOS type photodiode and a Schottky type photodiode.

By forming the probe of the photodetector element of any of a pn junction gate type photo FET, a Schottky gate type photo FET, an MOS type photodiode and a Schottky type photodiode, a compact sensor results. The SPM sensor according to the present invention therefore easily picks up a weak incident light such as evanescent light, and achieves the first and second objects.

The integrated SPM sensor according to the present invention is constructed by forming, on the surface of its photodetector element constituting a probe, a transparent layer that exhibits a substantially nonreflective characteristic to incident light. In another aspect of the integrated SPM sensor of the present invention, the thickness of a region, insensitive to the incident light and existing in the top portion of photoelectric conversion region of the photodetector element is set to be half the absorption length of the incident light. In another aspect of the integrated SPM sensor of the present invention, the tip of the region, insensitive to the incident light and existing in the top portion of photoelectric conversion region of the photodetector element is removed. Each of the above arrangements helps strengthen the signal picked up by the photodetector element, thus improves sensitivity, and thereby achieves the third object of the present invention.

In another aspect of the SPM sensor of the present invention, a layer having a light-cutting characteristic is formed on the inclined surface of the photodetector element constituting the probe. This arrangement results in a high sensitivity integrated SPM sensor with reduced noise characteristic, and thereby achieves the third object of the present invention.

In yet another aspect, the SPM sensor of the present invention comprises a cantilever having a probe on its free end, a supporting base for supporting the fixed end of the cantilever, a photodetector element disposed on the probe, signal lines for conducting a signal picked up by the photodetector element, wherein the cantilever and supporting base are constructed of n-type semiconductor substrate.

By constructing the cantilever and supporting base of n-type semiconductor substrate, a p+-n photodiode of p+ diffusion layer and n-type semiconductor substrate is formed in the case of a photodiode type photodetector element, and a phototransistor of p+ diffusion layer as its gate or base is formed in the case of a phototransistor type photodetector element. If positive interface charge exists on the surface of the device constructed of n-type semiconductor substrate, the surface of the substrate is constantly kept at a electron charged state. No depletion layer exists under the surface of the substrate. Since any region is in a carrier (electron)

charged state, the generation rate of dark current is substantially reduced. Therefore, dark current noise due to thermal excitation is substantially reduced, and an integrated SPM sensor having a substantially improved S/N ratio results. By doping the n-type semiconductor substrate, which forms the cantilever and supporting base, with an impurity as dense as $1\times10^{14}$ to $1\times10^{17}$ cm$^{-3}$ an improved S/N ratio is achieved at optimum conditions. The fourth object is thus achieved.

In still another aspect, the SPM sensor of the present invention comprises a cantilever having a probe on its free end, a supporting base for supporting the fixed end of the cantilever, and a physical quantity to current converting sensor element disposed on the cantilever, whereby the cantilever has a heavily impurity doped diffusion layer at least on its side surface. Furthermore, the heavily impurity doped diffusion layer is formed in a manner that the layer surrounds the physical quantity to current converting sensor element disposed on the cantilever.

The above arrangement allows hole-electron pairs which are generated in the portion of the cantilever other than the physical quantity to current converting sensor element region, to recombine in the heavily impurity doped diffusion layer on the surface of the cantilever. The generation of dark current is thus prevented and a high sensing sensitivity, integrated SPM sensor results. The fourth object is thus achieved.

In yet another aspect of the present invention, the physical quantity to current converting sensor element is constructed of a semiconductor photodetector element in the vicinity of the probe. This arrangement results in an integrated SPM sensor that offers a high sensitivity in SNOM measurements.

In still another aspect of the present invention, the physical quantity to current converting sensor element is constructed of a strain detector element. This arrangement results in an integrated SPM sensor that offers a high sensitivity in AFM measurements.

In yet another aspect of the present invention, the physical quantity to current converting sensor element is constructed two or more different kinds of sensor elements. This arrangement results in an integrated SPM sensor that offers two or more kinds of measurements with high sensitivity.

In yet another aspect of the present invention, the physical quantity to current converting sensor element is constructed of a semiconductor photodetector element and a strain detector element. This arrangement results in an integrated SPM sensor which permits simultaneous SNOM and AFM measurements with high sensitivity.

BRIEF DESCRIPTION OF THE DRAWINGS

FIG. 16 is a cross-sectional view showing the structure of the tip of the SPM sensor according to a second embodiment of the present invention.

FIG. 17 is a cross-sectional view showing the structure of the tip of the SPM sensor according to an alternate example of the second embodiment.

FIG. 18 is a cross-sectional view showing a third embodiment of the present invention.

DETAILED DESCRIPTION OF THE PREFERRED EMBODIMENTS

The basic technique of the semiconductor photodetector element for picking up light is first discussed before the description of the embodiments. When a semiconductor photodetector element is used to pick up light, the following four important functions need to be considered.

(1) Guiding an incident light into the semiconductor region with a minimum loss involved.

(2) Efficiently absorbing (photoelectrically converting) light in the semiconductor region.

(3) Efficiently gathering photo-excited charge generated in light absorption in a charge storage region.

(4) Efficiently delivering the gathered charge.

The above four functions are now discussed one-by-one. Function (4) is detailed in the description of each embodiment.

Function (1)

Figure 1A:
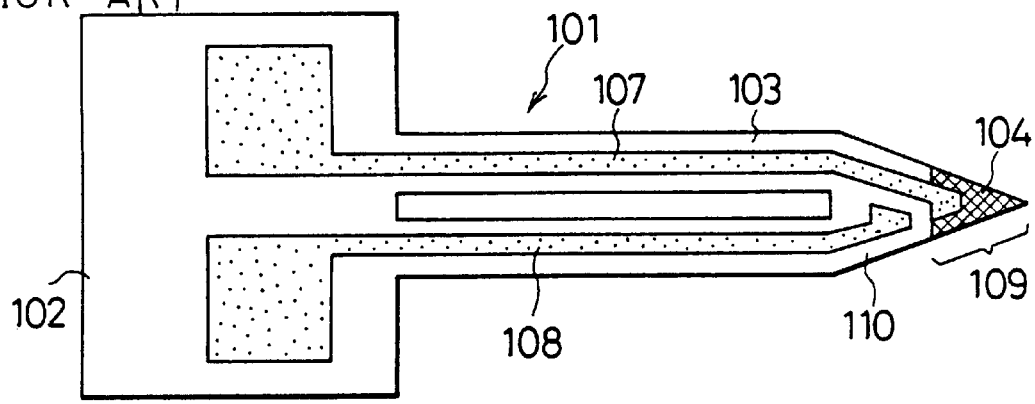
FIGS. 1A and 1B are plan and cross-sectional views showing the design of the known SNOM probing appratus.
Figure 1B:
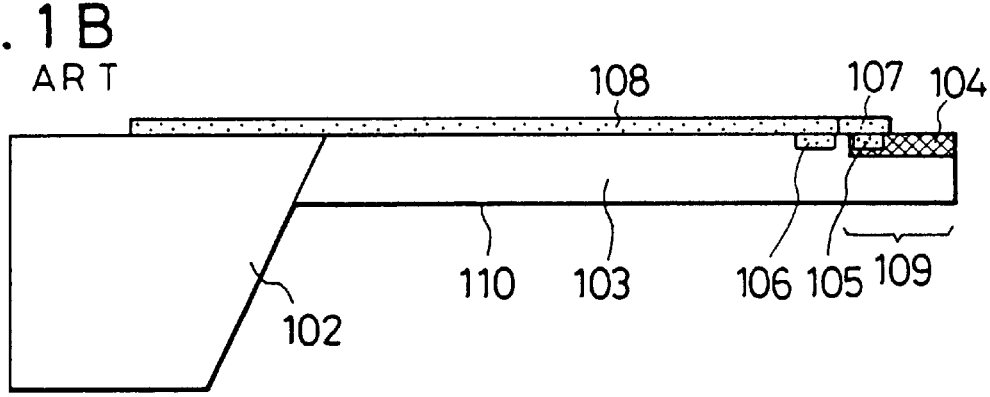
Figure 2:
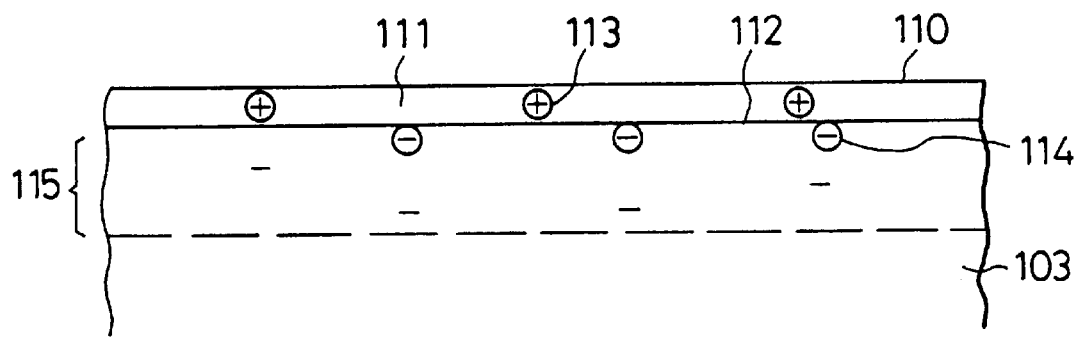
FIG. 2 is an explanatory enlarged view showing the exposed surface of the known SNOM probing appratus shown FIGS. 1A and 1B.
Figure 3:
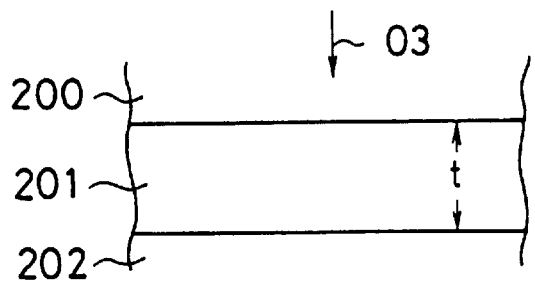
FIG. 3 shows means that guides an incident light into a semiconductor region with a minimum loss.

Suppose that an incident light 203 coming in from the air 200 (refractive index $n_0=1$) is transmitted through a transparent insulating thin layer 201 (refractive index $n_1$) having a thickness of t and enters a semiconductor 202 (refractive index $n_2$) as shown in FIG. 3. Contemplated as the candidate material for the transparent insulating thin layer 201 are $SiO_2$ ($n_1=1.45$), $Ta_2O_5$ ($n_1=2.37$), and $Si_3N_4$ ($n_1=2.00$). Within the visible light region ($\lambda=400$ to 700 nm), these materials have constant refractive index values independent of wavelength. Furthermore, $SiO_2$, $Si_3N_4$ and the like are free from absorption within the visible light region.

Figure 4:
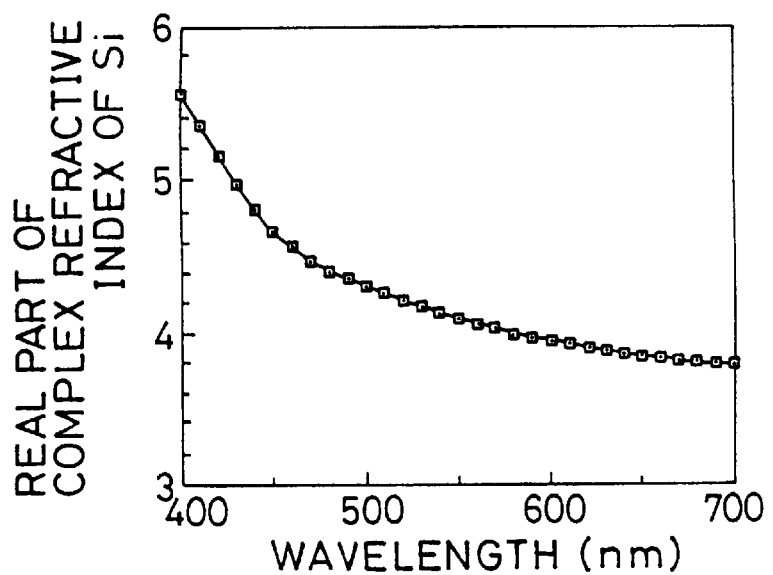
FIG. 4 shows the relationship between the real part of complex refractive index of monocrystal silicon and wavelength of light.
Figure 5:
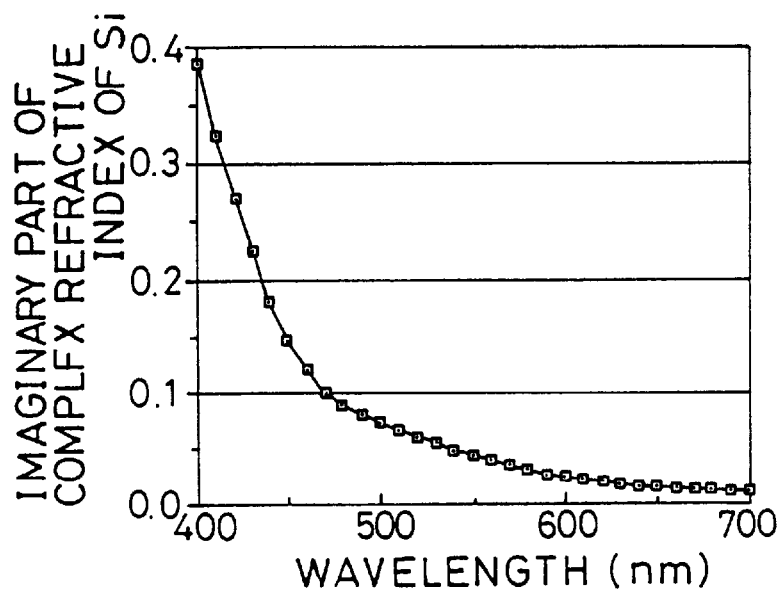
FIG. 5 shows the relationship between the imaginary part of complex refractive index of monocrystal silicon and wavelength of light.

Next, suppose that the semiconductor 202 is monocrystalline silicon. FIGS. 4 and 5 show the real and imaginary parts of a complex refractive index (n–ik) of monocrystalline silicon with respect to wavelength of the incident light. As seen from FIGS. 4 and 5, the real and imaginary parts of the complex refractive index of monocrystalline silicon are a wavelength dependent function. This complex refractive index contrasts with the refractive index of the insulating material such as $SiO_2$ that is independent of wavelength.

When the incident light 203 enters the semiconductor 202 in the structure in FIG. 3, it suffers multiple reflection at the boundary between the air and the surface of the insulating layer and interference effect in the insulating thin layer of thickness t. The condition presented by the following equations (1) and (2) is called a nonreflective condition. An incident light must meet the condition to fully reach the semiconductor.

$$n_1 t = \lambda/4 \qquad (1)$$

$$n_1^2 = n_0 \cdot n_2 \qquad (2)$$

where $\lambda$ is the wavelength of the incident light. If the incident light is He—Ne laser light, its wavelength is 633.4 nm.

Assuming that a light of 633.4 nm, after coming in from the air and passing through the insulating thin layer, enters the silicon semiconductor, 3.88 is read out as the real part of complex refractive index of silicon at $\lambda=633.4$ nm in FIG. 4. From equation (2), to satisfy the nonreflective condition, the transparent insulating thin layer has desirably the following refractive index as equation (3) determines.

$$n_1 = (n_0 n_2)^{1/2} = (1 \times 3.88)^{1/2} = 1.97 \qquad (3)$$

$Si_3N_4$ ($n_1=2.00$) is a preferred candidate material. From equation (1), the thickness t of $Si_3N_4$ is desirably as determined by equation (4) with respect to the incident light of $\lambda=633.4$ nm.

$$t = \lambda/(4 \cdot n_1) = 633.4/(4 \cdot 2) = 79.2 \ (nm) \qquad (4)$$

Figure 6:
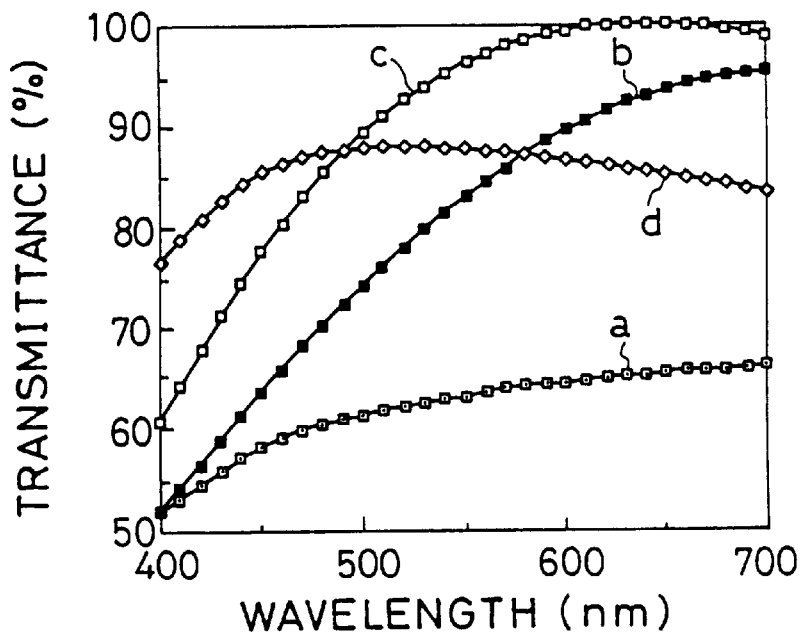
FIG. 6 shows the relationship between visible light wavelength and transmittance in an insulating layer.

FIG. 6 shows transmittance T calculated with each layer thickness t set to 80 nm in one case where no insulating thin layer 201 is employed and in three different cases where each of $Ta_2O_5$, $Si_3N_4$, and $SiO_2$ is employed as the insulating thin layer 201. Although an electromagnetics method has been utilized to compute transmittance, its explanation is omitted herein. In FIG. 6, the curve a represents transmittance for an air/Si structure, the curve b, one for an air/$Ta_2O_5$/Si structure, the curve c, one for an air/$Si_3N_4$/Si structure, and the curve d, one for an air/$SiO_2$/Si structure. As understood from the curve a in FIG. 6, the lowest transmittance T results in the structure in which light directly enters silicon semiconductor (T=65.1% at $\lambda=630$ nm).

Generally, reflectance R in a boundary is expressed by equation (5) as follows:

$$R = (n_0 - n_1)^2 / (n_0 + n_1)^2 \qquad (5)$$

The reflectance $n_1$ of Si at $\lambda=400$ nm is 5.55, and thus $R=(55.5-1)^2/(5.55+1)^2=0.48$. The reflectance $n_1$ of Si at $\lambda=700$ nm is 3.78, and thus $R=(3.78-1)^2/(3.78+1)^2=0.34$. Reflectance R and transmittance T are related by equation (6) as follows:

$$R + T = 1 \qquad (6)$$

Transmittances T at $\lambda=400$ nm and 700 nm, are 0.52 and 0.64, and these agree with the calculation result given in FIG. 6.

As seen from FIG. 4, as wavelength increases, refractive index n of silicon decreases, and thus transmittance (the ratio with which light enters silicon) increases. In the structure of air/$Si_3N_4$/Si, the setting of t=80 nm and $n_1=2.00$, satisfies the nonreflective condition equations (1) and (2) at $\lambda=633.4$ nm. Thus, transmittance at $\lambda=633.4$ nm is approximately 100% (99.9% in calculated result).

In terms of refractive index $n_1$, $Ta_2O_5$, $Si_3N_4$ and $SiO_2$ are related in the order of magnitude as follows: $Ta_2O_5 > Si_3N_4 > SiO_2$. In terms of wavelength that gives peak transmittance, $Ta_2O_5$, $Si_3N_4$ and $SiO_2$ are related as follows: $Ta_2O_5 > Si_3N_4 > SiO_2$. This is because, from equation (1), the wavelength that results in a peak transmittance is expressed by equation (7). Given a constant thickness t, the larger the refractive index n, the longer the wavelength $\lambda$.

$$\lambda = 4 \cdot n \cdot t \qquad (7)$$

Materials, except $Si_3N_4$, are unable to reach a transmittance of 100% even at its peak transmittance value.

This is because materials other than $Si_3N_4$ fail to satisfy equation (2). At $\lambda=630$ nm, the transmittance of $SiO_2$ is 85.7%, and that of $Ta_2O_5$ is 92.1%.

Figure 7:
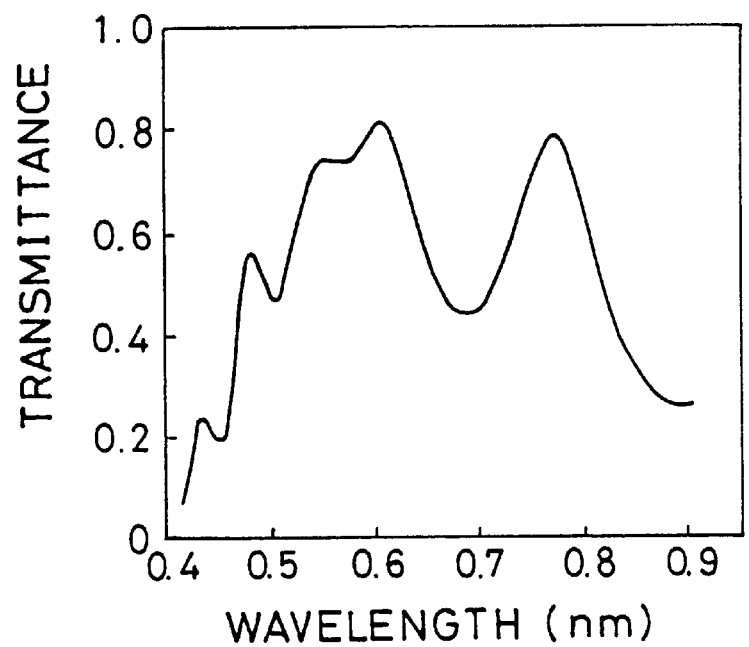
FIG. 7 shows the relationship between visible light wavelength and transmittance in multi-layers.

As already described, transmittance T in FIG. 6 is computed according to the electromagnetics method. This electromagnetics method is equally effective in computing transmittance of a multi-layered structure. FIG. 7 is the example of computation of transmittance T for a multi-layered structure of $SiO_2(d_1)$/polycrystal $Si(d_2)$/$SiO_2$ ($d_3$) /Si, wherein $d_1=0.1$ $\mu$m, $d_2=0.29$ $\mu$m, $d_3=0.19$ $\mu$m. As understood from FIG. 7, a plurality of peaks take place due to the multiple interference effect of the multilayered structure.

Analysis of the nonreflective condition is also applied to the multi-layered structure as in the single layered structure. The multi-layered structure constructed of the air (n=1.0)/ $SiO_2$ (n=1.5)/$Si_3N_4$ (n=2.00)/Si is now considered. In a partial structure of the air/$SiO_2$ /$Si_3N_4$, the refractive index of each layer roughly satisfies equation (2). In the structure of $SiO_2$ /$Si_3N_4$ /Si, the refractive index of each layer nearly satisfies equation (2). Furthermore, in the above multi-layered structure, the thickness of each insulating layer is set to satisfy equation (1).

Function (1) is thus summarized as follows:

① If the semiconductor is monocrystalline silicon, a single layer of $Si_3N_4$ or a multi-layer of $SiO_2$/$Si_3N_4$ is preferred as a top layer. Both roughly satisfy the nonreflective condition equation (2).

② In connection with the thickness of each of top layers, the wavelength to be picked up is first determined, the refractive index of each layer at the determined wavelength is then determined, and the thickness of each layer is now set to satisfy equation (1). Such a series of steps allow the transmittance of light through to the semiconductor to be maximized and achieves excellent sensitivity.

Function (2)

Light absorption in the semiconductor or more generally in a solid body is explained by the Lambert's law or equation (8).

$$T_1 = I/I_0 = exp(-\alpha x) \qquad (8)$$

where $T_1$ is transmittance, $I_0$ is the intensity of an incident light, and I is the intensity of the light that has transmitted a material having a thickness of x. $\alpha$ is an absorption coefficient, which is related with k in complex refractive index (n−ik) as expressed by equation (9).

$$\alpha = 4\pi k/\lambda \qquad (9)$$

Since k=0 for $SiO_2$, $Si_3N_4$, and $Ta_2O_5$ within the visible light region, $I=I_0$. Therefore, no absorption takes place. The k value for the monocrystal silicon is plotted in FIG. 5.

Figure 8:
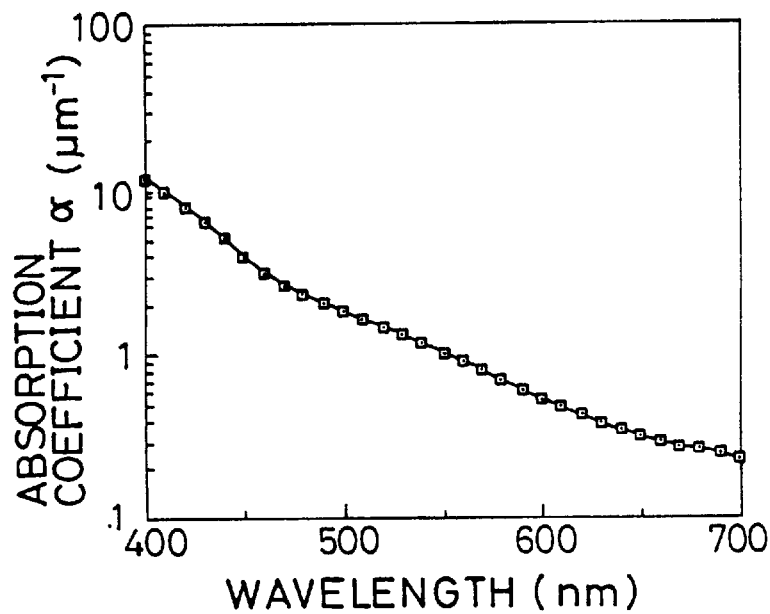
FIG. 8 shows the relationship between visible light wavelength and absorption coefficient in monocrystalline silicon.
Figure 9:
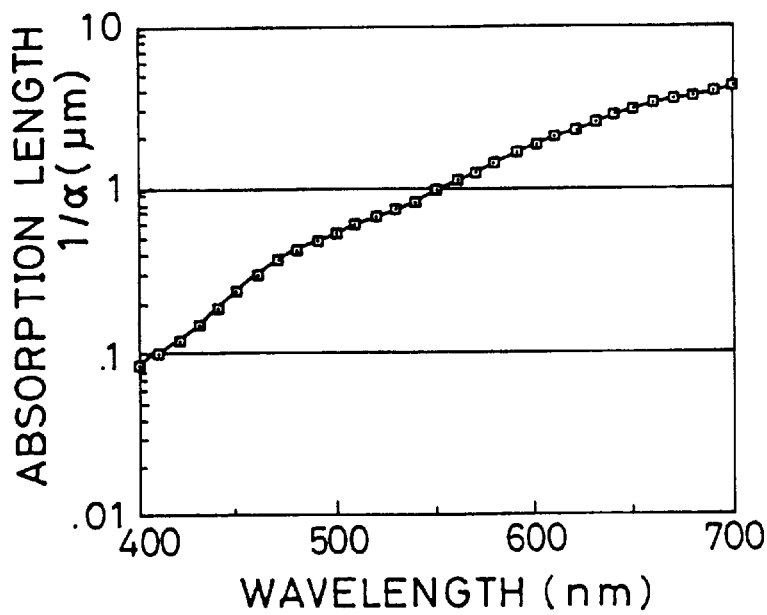
FIG. 9 shows the relationship between visible light wavelength and absorption length in monocrystalline silicon.

FIG. 8 shows the plot of the absorption coefficient $\alpha[\mu m^{-1}]$ of the monocrystal silicon with respect to visible light wavelength, calculated by equation (9). FIG. 9 shows the relationship between $1/\alpha[\mu m]$ (absorption length) and wavelength. $1/\alpha$ is called absorption length. When Light passes through a layer of $1/\alpha$ thickness, the transmitted light has an reduced intensity as equal as 1/e=36.8% of the one the incident light. Since the absorptance A and the transmittance $T_1$ are related by equation (10), A =63.2% of the incident light is absorbed.

$$A + T_1 = 1 \qquad (10)$$

Namely, the absorption length ($1/\alpha$) works as a measure of thickness of a semiconductor layer to estimate absorption of the incident light. When the thickness of the semiconductor layer is double, three-fold and four-fold the absorption length, the ratio of absorption of light is 86%, 95%, and 98%. This suggests that the semiconductor layer is sufficient enough if it is twice as thick as the absorption length.

From equations (8) and (10), the absorptance A for the monocrystal silicon or other more common material is expressed by equation (11) if it is a single-layered absorption material.

$$A = 1 - exp(-\alpha x) \qquad (11)$$

Figure 10:
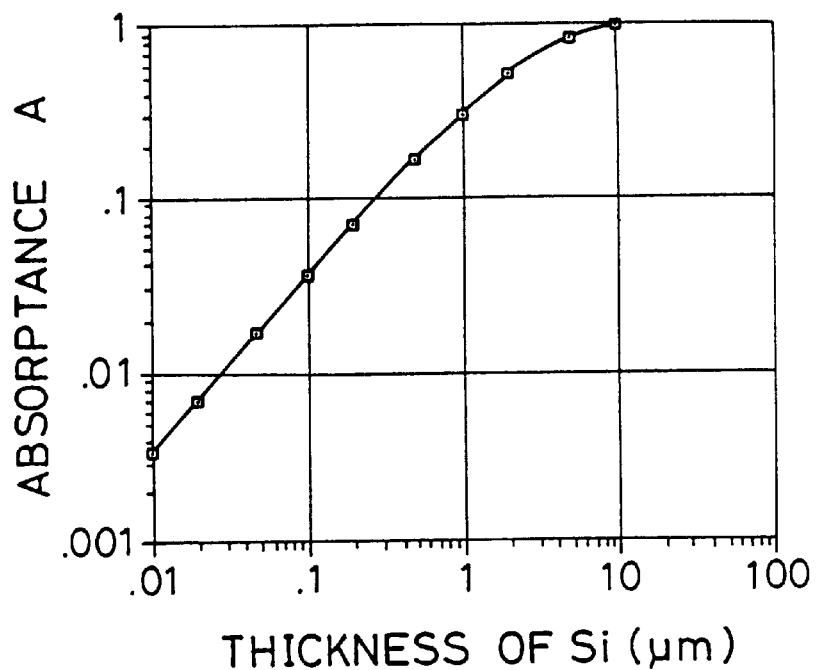
FIG. 10 shows the relationship between the thickness of silicon and its absorptance.

For example, absorption coefficient $\alpha$ is 0.348 at $\lambda$=630 nm. FIG. 10 shows the result of calculation of the absorptance A (the ratio of absorption of photons within a layer of thickness x). Table 1 shows the result of calculation of the relationship between the absorptance A and the thickness of Si at a wavelength $\lambda$=630 nm.

TABLE 1

| Thickness of Si ($\mu$m) | 1.0 | 2.0 | 3.0 | 4.0 | 5.0 |
|---|---|---|---|---|---|
| Absorptance A (%) | 29.4 | 50.1 | 64.8 | 75.1 | 82.4 |

When the thickness of Si is 2$\mu$m, approximately half the incident light to Si is absorbed. In this case, the absorption length is 2.87 am.

Energy of light E (eV) is expressed as a function of wavelength as follows:

$$E\ (eV) = 1240/\lambda(nm) \qquad (12)$$

Thus, energy of light of $\lambda$=630 nm is 1.97 eV. Energy is also expressed in joule as follows:

$$E(J) = (1240/\lambda)q = (1240/\lambda) \times 1.6 \times 10^{-19} \qquad (13)$$

Energy of light of $\lambda$=630 nm is thus $3.15 \times 10^{-19}$ J.

Band gap energy $E_g$ of the monocrystalline silicon is 1.12 eV. By modifying equation (12), absorption edge $\lambda_c$ (light having wavelength longer than this threshold wavelength, namely light of lower energy is not absorbed) of the incident light to Si is expressed as follows:

$$\lambda_c = 1240/\ E_g = 1240/1.12 = 1107\ (nm) \qquad (14)$$

In the visible light region of $\lambda$=400 nm to 700 nm, the absorption of one single photon is believed to generate a single hole-electron pair. To summarize the above discussion, an example of calculation is briefly explained. Suppose that the incident light of $\lambda$=630 nm at an intensity of 1 pW irradiates a light pickup region, the population of incident photons is $1 \times 10^{-12}$ [J/S] / {(1240/63:3)$\times 1.6 \times 10^{-19}$ [J/photons] =$3.2 \times 10^6$ [photons/S]. If this light is picked up by the structure of $Si_3N_4$ layer (80 nm)/Si layer (3 gm), a transmittance of 100% and an absorptance of 64.8% result if the same calculation method already described is applied. The population of hole-electron pairs generated in the monocrystalline silicon of the photodetecting section is $3.2 \times 10^6 \times 0.65 = 2.07 \times 10^6$[pairs/S].

As will be described in detail, if these hole-electron pairs generated are fully available for reading and if corresponding current is directly read in non-accumulation mode, its current value is expected to be $2.07 \times 10^6 \times 1.6 \times 10^{-19} = 0.33$ pA. On the other hand, if carriers are accumulated in a photodiode for 1/60 second, the population of carriers accumulated is $2.07 \times 10^6 \times 1/60 = 3.4 \times 10^4$ [carriers] if all the carriers are fully accumulated.

Function (2) is summarized as follows: In response to the wavelength $\lambda$ of the incident light, the absorption coefficient $\alpha$ of the semiconductor is determined. The thickness of the photodetecting section is desirably twice to three times the absorption length $1/\alpha$. Even if that thickness is difficult to achieve, the thickness is desirably set to be as thick as possible.

Function (3)

The photodetecting section must be fabricated in a photodiode structure. This photodiode structure must be formed so that optically generated charge is efficiently gathered in an accumulation region with no chance of recombination. In principle, the photodiode is reverse biased to perform photodetecting operation.

Figure 11:
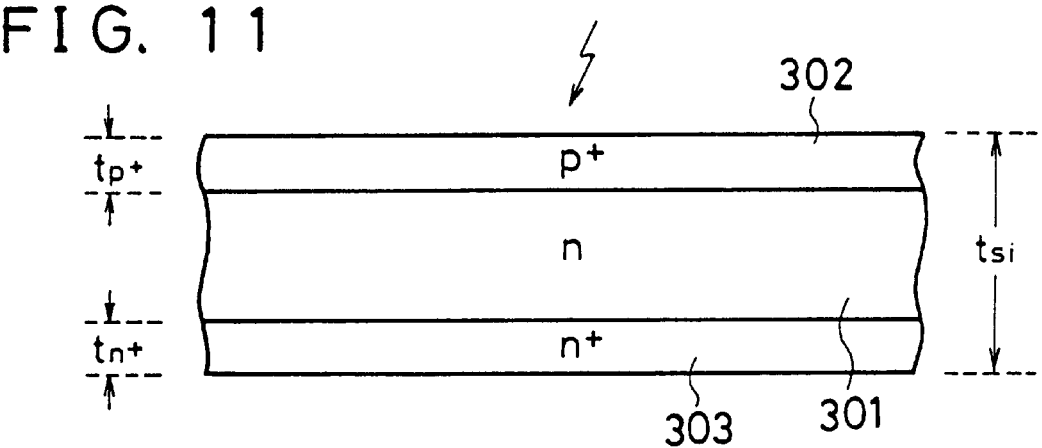
FIG. 11 shows the structure of the pn junction of a photodiode.

The photodiode structure having a pn junction shown in FIG. 11 is now considered as an example of the photodiode structure. The pn-junction photodiode is one of the widely used photodiode types. A $p^+$ egion 302 is formed on top of an n-type region 301. An $n^+$ egion 303 is sometimes formed on the opposite side, namely bottom side of the photodiode from its light receiving surface. FIG. 11 shows the case with the n⁺ region 303. Let $t_{si}$ to represent the overall thickness of the photodiode, $t_{p+}$ the thickness of the p⁺ region 302, and $t_{n+}$ the thickness of n⁺ region 303.

In the actual manufacturing process of semiconductor photodetector devices, thicknesses $t_{p+}$, $t_{n+}$ are restricted 0.5 μm or less. Both the p⁺ region 302 and n⁺ region 303 are heavily impurity doped regions (impurity concentration of $10^{16}$ to $10^{20}$ cm⁻³). Suppose the worst case in which no hole-electron pairs contribute to a signal current because of recombination even when the incident light generates hole-electron pairs in such heavily impurity doped regions. The n-type region 301 is reverse biased, and thus remains in the depletion state. It is assumed that the hole-electron pairs generated in the n-type region 301 are fully available and fully extracted as photocurrent.

In this case, from equation (8), namely the Lambert's law, effective photocurrent is expressed as follows:

$$A = [1 - \exp\{-\alpha(t_{si} - t_{n+})\}] - [1 - \exp\{-\alpha \cdot t_{p+}\}] = \exp(-\alpha \cdot t_{p+}) - \exp\{-\alpha(t_{si} - t_{n+})\} \quad (15)$$

Substituting $t_{p+}$=0.5 μm, $t_{si}$=3 μm, $t_{n+}$=0.5 μm, and α=0.348 (λ=633 nm) results in absorptance A=0.84−0.42=0.42=42%.

In the above discussion of function (2), when the 3 μm thick silicon layer in whole forms effective photoelectric conversion region, its absorptance (conversion efficiency) is 64.8%. However, it is found that even if the n-type region 301 is sandwiched between 0.5 μm thick, heavily impurity doped regions as insensitive regions, however, no substantial sensitivity drop takes place on the incident light of λ=633 nm. The n-type region 301 having no n⁺ region 303 on its bottom results in an absorptance A of 49%.

The above example is discussed on the assumption that the incident light is a red light of 633 nm wavelength. If it is blue light, however, the effect of the thickness of the p+ region 302 as the insensitivity region becomes great. In fact, when the absorptance A of the photodiode of the above-described structure is calculated for the incident light of λ=450 nm (α=4.1) using equation (15) assuming that the p+ region 302 is attached on top, absorptance is A=exp (−4.1× 0.5)−exp (−4.1×2.5)=0.129−3.5×10⁻⁵≈12.9%. On the other hand, without p+ region 302 on top, the photodiode gives absorptance A=1−exp (−4.1×2.5)−100%. This suggests that a monocrystalline silicon layer of 0.5 μm thick absorbs the majority of the blue light as the incident light.

Actual n⁺ and p⁺ regions are thinner than those assumed above, and have a slight degree of sensitivity. Thus, with these heavily impurity doped regions employed, no substantial sensitivity drop takes place on and in the vicinity of wavelength λ=630 nm. For example, if diffusion depths ($t_{n+}$, $t_{p+}$) of the n+ and p+ regions are 0.3 μm, the calculation of equation (15) results in an absorptance of 51%, which is not so bad efficiency compared to a absorptance of 64.8% with both n+ and p+ regions not employed. In this case, sensitivity drop ratio is 0.79.

As already described, the n-type region 301 desirably remains in the depletion state in FIG. 11, from the standpoint of sensitivity. Discussed next is a bias value required for putting in complete depletion state the n-type region 301 having an impurity concentration of 1×10⁻¹⁵ cm⁻³. Assuming a one-side step junction, the width W (cm) of the depletion layer is expressed as follows:

$$W_d = \{(2K_s \cdot \epsilon_o / q \cdot N_D) \times \Phi_T\}^{1/2} \quad (16)$$

where $K_s$ is the relative dielectric constant of silicon, $\epsilon_o$ is the dielectric constant of vacuum, q is the elementary electric charge, $N_D$ is the impurity concentration. $\Phi_T$ is expressed by equation (17) as follows:

$$\Phi_T = V_R + \Phi_{Bi} \quad (17)$$

where $V_R$ is the reverse bias voltage, and $\Phi_{Bi}$ is expressed by the following equation (18), $$\Phi_{Bi} = kT/q \cdot \ln(N_A N_D / n_i^2) \quad (18)$$

where kT/q is the thermalelectric potential, $N_A$ is the impurity concentration in the p⁺ region, and $n_i$ is the intrinsic carrier density.

Substituting $N_A$=10¹⁸cm⁻³ and $N_{D=10}$¹⁵cm⁻³ into equation (18), then $\Phi_{Bi}$=0.026×ln {10¹⁸×10⁵/(1.45 ×10¹⁰)²}= 0.76V. Equation (16) is rearranged into the following equation (19):

$$W_d = \{(2 \times 11.8 \times 8.86 \times 10^{-14} / 1.6 \times 10^{-19} \times 1 \times 10^{15}) \times (0.76 + V_R)^{1/2} \quad (19)$$

$$= 1.14 \times 10^{-4} \times (0.76 + V_R)^{1/2} \text{ [cm]}$$

$$= 1.14 \times (0.76 + V_R)^{1/2} \text{ [μm]}$$

Figure 12:
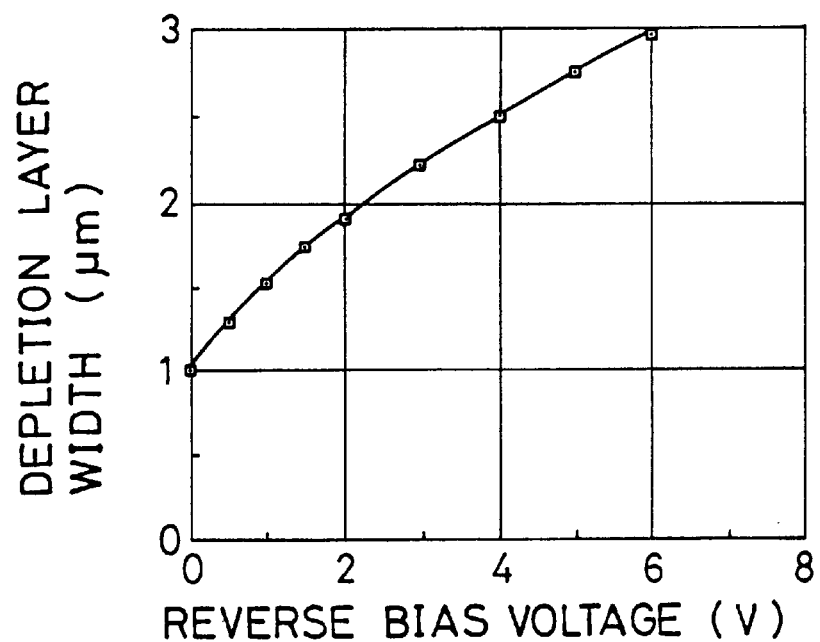
FIG. 12 shows the relationship between reverse bias and the width of a depletion layer in the structure of the photodiode.

FIG. 12 shows the relationship between the reverse bias voltage applied to the p+-n structure and the depletion layer width, obtained from equation (19). The actual p+ region is as thick as 0.3 μm or so. When $t_{si}$ is 3.0 μm, a reverse bias voltage of 5 V is sufficient. If a bias voltage smaller than this is applied, widening of the depletion layer to the bottom surface will be avoided.

Function (3) is summarized as follows:

① Light of wavelength λ enters the semiconductor photodetecting section. In this case, if the incident surface of the semiconductor photodetecting section is covered with a heavily impurity doped region that is free of depletion and is as thick as the absorption length determined by the wavelength λ of the incident light, more than half of the incident light is absorbed in the heavily impurity doped region as an insensitive region. This arrangement causes a substantial drop in the sensitivity of the photodetecting section. In other words, the thickness of the insensitive region on the incident surface of the photodetecting section is desirably half or thinner than the absorption length (transmittance 60%) of the light to be sensed.

② The semiconductor layer that constitutes a photoelectric conversion region is put into complete depletion state by applying the reverse bias voltage. Carriers are desirably transferred to the optically generated charge accumulation region, fast and with a low recombination rate, by means of the drift mechanism by field.

Function (4) of "efficiently deliver the gathered charge" will be detailed in the discussion of each embodiment.

With the above discussion for functions (1) through (3) in mind, discussed next are the embodiments of the integrated SPM sensor, having a photo-detector loaded cantilever, which delivers efficiently photocarriers that are optically generated, transferred and accumulated.

Figure 13A:
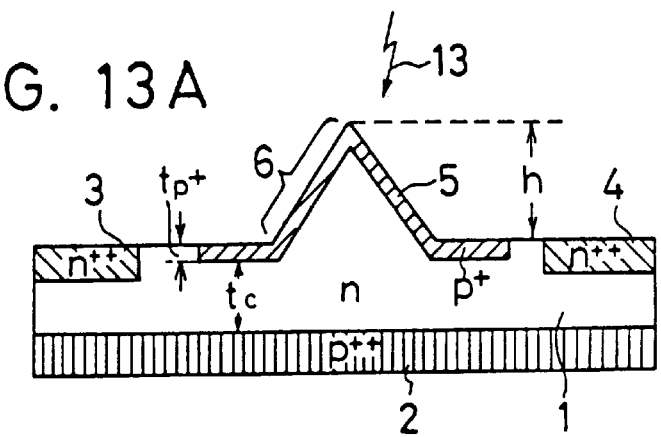
FIG. 13A through 13D are respectively a crosssectional view, a top plan view, a bottom plan view of the integrated SPM sensor according to a first embodiment of the present invention, and a top plan view of an alternate example of the first embodiment.
Figure 13B:
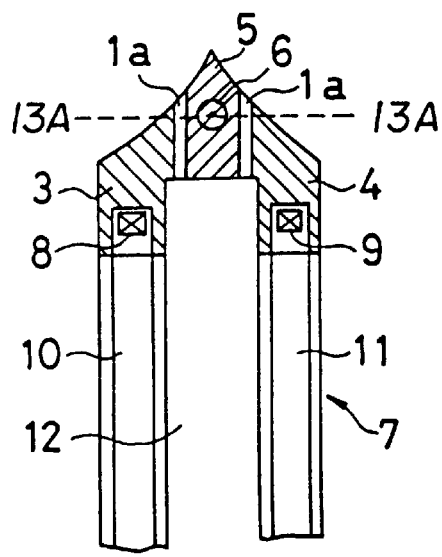
Figure 13C:
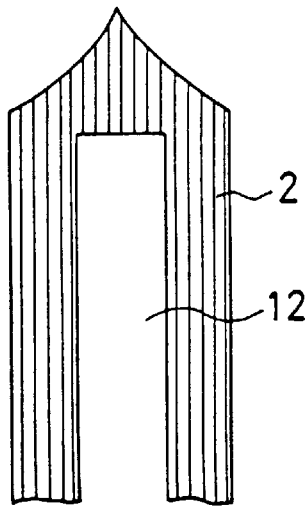

FIG. 13A is the cross-sectional view of the first embodiment of the present invention. FIG. 13B is the top plan view of the first embodiment. FIG. 13C is the bottom plan view of the first embodiment. FIG. 13A is the crosssectional view taken along the line 13A—13A in FIG. 13B. In FIG. 13A, a cross-sectional portion including that of a tip (probe) 6 best shows a photo-detector portion. Photo-detectors are divided into two main types: one is a photodiode type which accumulates optically generated carriers and directly delivers these photocarriers themselves externally for detection; and the other is a phototransistor type which accumulates optically generated carriers in its gate or base to allow the gate or base potential to vary with the optically generated carriers, and which detects the magnitude of the current, modulated with the varying potential and flowing between source and drain (emitter and collector). In both types, both accumulation detection mode and non-accumulation detection mode are contemplated, and the present invention takes both modes into consideration.

The first embodiment and the second embodiment as well are related to the integrated SPM sensor having a phototransistor type photo-detector. A junction gate type FET is used as the phototransistor type photo-detector in the first embodiment. Designated 1 in FIG. 13A is a n-type semiconductor of monocrystalline silicon that forms a photoelectric conversion region and a channel region where a source-drain current flows, both constituting a cantilever 7. The impurity concentration of the n-type semiconductor portion 1 ranges from approximately $1\times10^{14}$ cm$^{-3}$ to $1\times10^{17}$ cm$^{-3}$, The thickness $t_C$ of the channel region constructed of the n-type semiconductor portion 1 ranges from 0.5 to 5.0 μm.

A drain (source) n$^{++}$ type diffusion layer 3 in the junction gate type FET is formed on top of the cantilever. Designated 4 is a source (drain) n$^{++}$ type diffusion layer. Formed between the n$^{++}$ type diffusion layers 3, 4 is a p$^+$ type diffusion layer 5 that constitutes the gate diffusion region. The n$^{++}$ type diffusion layers 3, 4 have a surface concentration of approximately $1\times10^{19}$ cm$^{-3}$ or more and a junction depth of 0.5 μm or so. A tip 6 is formed on the end surface of the cantilever. The tip 6 is projected by a height of h from the cantilever surface. The p+ diffusion layer 5 is formed on the surface of the tip 6 and its vicinity, and constitutes the junction gate diffusion layer of the junction gate type photo FET. The p+ diffusion layer 5 has a junction depth $t_{p+}$ of 0.5 μm or less, and its surface concentration ranges from $1\times10^{16}$ cm$^{-3}$ to $1\times10^{19}$ cm$^{-3}$.

Formed beneath the n-type semiconductor layer 1 is a p++ type diffusion layer 2 that functions as the back gate region for the junction gate type photo FET. The impurity concentration of the p++ type diffusion layer 2 is preferably an order of magnitude greater than that of the n-type semiconductor portion 1.

In the first embodiment in FIG. 13A, the n-type semiconductor portion 1 and the p++ type diffusion layer 2 forms the structure of a junction diode. Alternatively, instead of the p++ type diffusion layer 2, a metal thin layer may be formed beneath the n-type semiconductor portion 1 to form a Schottky diode. Such a Schottky diode structure is equally applicable to all other embodiments to be described later having a junction diode structure on the substrate side. When the n-type semiconductor portion 1 is constructed of n-type conducting silicon, gold, aluminum, molybdenum, titanium or the like is employed as the metal thin layer material for the Schottky diode.

In the first embodiment in FIG. 13A, the p++ type diffusion layer 2 constitutes the junction diode on the substrate side. If a metal layer that reflects the incident light 13 is substituted for the p++ type diffusion layer 2, part of the incident light reaches the metal layer, is then reflected off the metal layer and re-enters the n-type semiconductor portion (photoelectric conversion region) 1. This arrangement presents an additional advantage that photoelectric conversion efficiency is increased. Furthermore, the metal layer reflects light coming in from below, cutting off stray light, and thereby reducing noise level. This is another additional advantage.

The plan structure of the first embodiment is now discussed before discussing its operation. In FIG. 13B, the tip 6 constitutes the probe, the surface of which is constructed of the p+ type diffusion layer 5 as the junction gate diffusion layer. A spacer portion 1a of the n-type semiconductor portion 1 separates the n++ type drain diffusion layer 3 from the p+ type diffusion layer 5 and another spacer portion 1a of the n-type semiconductor layer 1 separates the n++ type source diffusion layer 4 from the p+ type diffusion layer 5. When the n++ type diffusion layers 3, 4 and the p+ type diffusion layer 5 are reverse biased with sufficient withstand voltage assured, however the spacer portions 1a are not necessarily required. Specifically, the spacer portions 1a are not required when the surface concentration of the p+ type diffusion layer 5 is approximately $1\times10^{18}$ cm$^{-3}$ or less.

Designated 8 and 9 are respective contacts for the n++ type drain (source) diffusion layer 3 and the n++ type source (drain) diffusion layer 4. Designated 10 and 11 are respective metal wirings for the drain (source) and the source (drain), and they are made of aluminum, for example. FIG. 13C shows the bottom plan structure. The p++ type diffusion layer 2 constitutes the back gate, to which a back gate voltage is applied. Designated 12 is a gap from which material is removed by etching in the manufacturing process of the cantilever of the integrated SPM sensor.

Figure 13D:
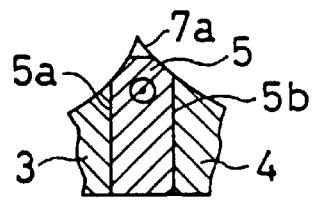

The cantilever 7 may be covered with the p+ type diffusion layer 5 with its end portion 7a left blank as shown in FIG. 13D rather than is covered all the way to its end as shown in FIG. 13B. The p+ type diffusion layer 5 as in FIG. 13D lowers the gate capacitance at the p+ type diffusion layer 5, increasing photodetecting sensitivity. The requirement for the plan structure of the p+ type diffusion layer 5 is that the edges 5a and 5b of the p+ type diffusion layer 5 run entirely across the cantilever surface. Such a structure prevents uncontrollable source-drain current from existing.

The operation of the first embodiment of the present invention is now discussed. The cantilever 7 is positioned so that light 13 comes in from above as in FIG. 13A. A diversity of lights such as evanescent light and laser light may be used as the incident light 13. When the incident light 13 enters the tip 6, hole-electron pairs are generated in the p+ type diffusion layer 5, n-type semiconductor portion 1, and p++ type diffusion layer 2. As already described in functions (1) through (3), if the surface of the tip 6 is provided with a layer transparent to the incident light and meeting the nonreflective condition to the incident light, the photodetecting sensitivity is excellent compared with the case in which the p+ type diffusion layer 5 is directly exposed to the air. This point is applicable to all embodiments.

When the tip 6 is constructed of monocrystalline silicon as already described, a single layer of $Si_3N_4$ or a multi-layer of $SiO_2/Si_3N_4$ is preferred as the transparent layer. Even when the single layer of $SiO_2$ is employed, an improved sensitivity is better than the case in which silicon is directly exposed to the air.

The incident light 13 passes through the p+ type diffusion layer 5 with part of it absorbed. As already described, the relationship of x≦(absorption length/2) is preferably satisfied wherein x is the thickness of the p+ type diffusion layer 5 through which the incident light travels and the absorption length is determined by the wavelength λ of the incident light. Under the condition of x=(absorption length/2), approximately 60% of the incident light reaches the n-type semiconductor portion 1.

When x cannot be set to satisfy the relationship of $x \leq$ (absorption length/2), the photodetecting sensitivity is improved by lowering the impurity concentration of the p+ type diffusion layer 5 and by lengthening the diffusion length of electrons that are the minority carrier in the p+ type diffusion layer 5. Specifically, the surface concentration of the p+ type diffusion layer 5 is set to be within the range of $10^{16}$ to $10^{17}$ cm$^{-3}$. A shallower diffusion depth of the p+ type diffusion layer 5 is preferable, in this case. Specifically, $t_{p+}$ is set to be 0.3 μm or less.

As already described, the sum $(h+t_c)$ of the height h of the tip 6 and the thickness $t_c$ of the n-type semiconductor portion (channel layer) 1 is preferably set to be equal to or greater than twice the absorption length that is determined by the wavelength λ of the incident light. For example, for the incident light of λ=633 nm, the absorption length of silicon is 2.87 Mm. When $t_c$ is 2 μm and h is 5 μm, $(h+t_c)$ is 7 μm, which is 2.4 times the absorption length, thus greater than twice the absorption length. This satisfies the already described relationship. In this case, 91% of the incident light to the n-type semiconductor portion 1 is absorbed.

The incident light 13 is photoelectrically converted in the n-type semiconductor portion 1. Holes of the generated carriers flow to the p+ type diffusion layer 5 that is reverse biased.

Figure 14:
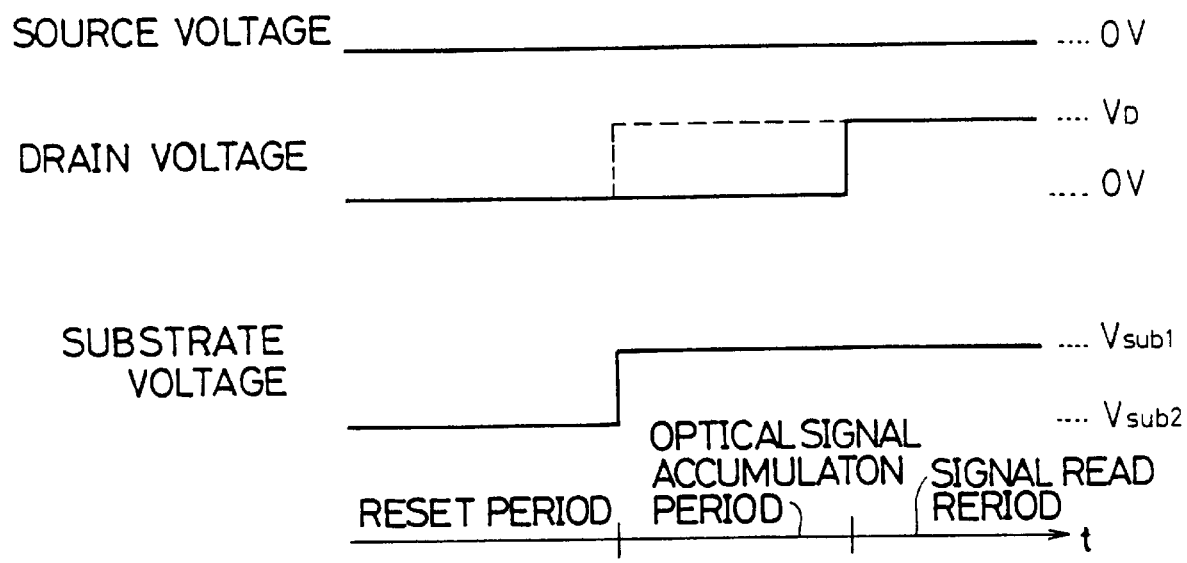
FIG. 14 is a timing diagram showing the driving pulse of a junction gate photo FET.

The above discussion covers the operation of the SPM sensor to its photoelectric conversion. Discussed next is the specific operation of the junction gate type photo FET. FIG. 14 is the timing diagram of the driving pulse of the junction gate type photo FET. Each operation cycle consists of the following three periods: a reset operation period for resetting the optically generated and accumulated carriers, an accumulation period for accumulating the optically generated carriers (optical signal accumulation phase), and a signal read period. Upon the completion of the signal read period, the next reset period is repeated.

Throughout the operation cycle, source voltage is kept at ground potential (0 V). During the reset period, drain voltage is 0 V, the p++ type diffusion layer (substrate) 2 is supplied with a large magnitude negative voltage $V_{sub2}$ to put at least the thickness $t_c$ of the n-type semiconductor portion 1 into complete depletion state, thereby sweeping the accumulated holes in the p+ type diffusion layer 5 into the p++ type diffusion layer 2 (punch through reset).

Equation (16) gives a standard value for the voltage $V_{sub2}$ that is applied to the p++ type diffusion layer 2 during the reset period $(|V_{sub2}|>\Phi_T)$. The width $W_d$ of the depletion layer in equation (16) corresponds to $t_c$ in FIG. 13A. The concentration of the n-type semiconductor portion 1 corresponds to $N_D$. Since the $V_{sub2}$ applied to the p++ type diffusion layer 2 is a negative voltage, the absolute value of $V_{sub2}$ is substituted in equation (17).

$V_{sub2}$ derived from equations (16) to (18) is the minimum voltage capable of putting the n-type semiconductor portion 1 into depletion state. Since with $V_{sub2}$ applied, a potential barrier by the donor exists between the p++ type diffusion layer 2 and p+ type diffusion layer 5, the p++ type diffusion layer 2 is supplied with a voltage more negative than $V_{sub2}$ in practice. During the reset period, at least one of source voltage and drain voltage may be set to be floating.

The operation cycle shifts to the optical signal accumulation period in succession to the reset period. During the optical signal accumulation period, drain voltage is kept at ground potential (0 V), in principle. To monitor the optical signal, however, a positive drain voltage $V_D$ may be applied. The dotted line in FIG. 14 represents it.

Furthermore, during the optical signal accumulation period, the p++ type diffusion layer 2 is set to be at ground potential (0 V) or a small magnitude negative voltage $V_{sub1}$. During the optical signal accumulation period, holes, from among the optically generated carriers, are accumulated in the p+ type diffusion layer (gate region) 5.

The operation cycle shifts to the signal read period in succession to the optical signal accumulation period. During the signal read period, the p++ type diffusion layer 2 remains supplied with $V_{sub1}$. The drain is supplied with a positive voltage $V_D$.

Figure 15:
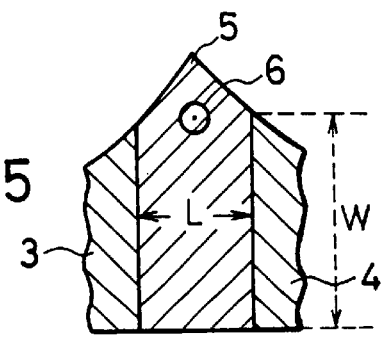
FIG. 15 is an enlarged view showing the tip of the SPM sensor of FIG. 13B.

The operation of the junction gate type photo FET during the signal read period is now discussed. In the non-saturation region ($V_D <<$ voltage of the p+ type diffusion layer 5) of the FET, an increase in the source-drain current $I_{DS}$ is calculated as follows:

$$I_{DS}=(W/L) \cdot \mu \cdot V_D N \cdot Y \cdot q \cdot t \quad (20)$$

where W is the gate width of the FET, L is the gate length of the FET. FIG. 15 is the enlarged top plan view of the tip of FIG. 13B. FIG. 15 shows the gate width W and length L. In the calculation of equation (20), L is assumed to be approximately 15 μm and W, approximately 45 μm. Also in equation (20), μ represents the mobility of electrons in the n-type semiconductor portion 1, and is on the order of $10^3$cm$^2$/V·S. $V_D$ is drain voltage, and $V_D$=1 V in the calculation herein. N represents the number of photons entering the photodetector, and its dimensions are [photons/second/cm$^2$]. Y represents quantum efficiency, q represents the elementary electric charge, and t represents an accumulation time.

Discussed next is an example of calculation of $I_{DS}$. Suppose that the incident light of wavelength λ=633 nm and 1 pW enters the tip. If the tip has the top Si$_3$N$_4$ layer to satisfy the nonreflective condition, the tip allows $3.2 \times 10^6$ photons/S to pass its surface. Converting this figure to N results in $4.74 \times 10^{11}$ photons/second/cm$^2$. Assuming that the thickness of the p+ diffusion layer 5 as the insensitive layer=0.5 μm, h=5 μm, and $t_c$=3 μm, absorptance is exp$(-0.348 \times 0.5)$−exp$(-0.348 \times 8)$=0.84−0.06=0.78=78%. Since the nonreflective condition is assumed, quantum efficiency r is 0.78. Given the accumulation time t of 1/60 second, the source-drain current $I_{DS}$ by optically generated and accumulated charge is calculated from equation (20):

$$I_{DS}=(45/15) \times 10^3 \times 1 \times 4.74 \times 10^{11} \times 0.78 \times 1.6 \times 10^{-19} \times (1/60)=2.96 \ \mu A.$$

A different method is used to check the above result. Modulation part of channel resistance of the FET is expressed by equation (21) as follows:

$$R=L/(q \cdot \mu \cdot N_d \cdot W \cdot \Delta d) \quad (21)$$

where L and other parameters are identical to those quoted in equation (20). Substituting an impurity concentration $N_D=1 \times 10^{15}$ cm$^{-3}$, equation (21) is calculated as follows:

$$R=15 \times 10^{-4}/(1.6 \times 10^{-19} 33 \ 10^3 \times 10^{15} \times 45 \times 10^{-4} \times \Delta d)=2.08/\Delta d \quad (22)$$

The dimension of R is [Ω].

A change Δd [cm] of the depletion layer width depends on a voltage change ΔV in the p+ type diffusion layer 5. Thus, ΔV is first calculated. ΔV is calculated by the following equation (23).

$$\Delta V = \Delta Q/C \quad (23)$$

where ΔQ is the electric charge optically generated and accumulated.

$$\Delta Q = \Delta 3.2 \times 10^6 \times 0.78 \times (1/60) \times 1.6 \times 10^{-19} 6.66 \times 10^{-15} \ [C]$$

Assuming that the p+ type diffusion layer 5 remains at −2 V in its floating state because of the reset operation, the initial width $W_d$ of the depletion layer is the value given by equation (19). Namely, $W_d=1.14\times10^{-4}\times\{(0.76+|V|\}^{1/2}=1.14\times10^{-4}\times(2.76)^{1/2}=1.894\times10^{-4}$ [cm]. Capacitance C is calculated as follows:

$$C[F]=L\cdot W\cdot (K_s\cdot \epsilon_o/W_d) \quad (24)$$

where $K_s$ is the relative dielectric coefficient of silicon, thus 11.8.

From equation (24), capacitance C is determined: $C=15\times10^{-4}\times45\times10^{-4}\times(11.8\times8.86\times10^{-14}/1.894\times10^{-4})=3.73\times10^{-14}$ [F]. This value is substituted in equation (23) to determine $\Delta V$. $\Delta V=6.66\times10^{-15}/(3.73\times10^{-14})=0.18$ [V]

Equation (19) is calculated to determine $\Delta d$ : $\Delta d$ $1.14\times10^{-4}\times\{(2.76)^{1/2}-(2.58)^{1/2}\}=1.14\times10^{-4}(1.661-1.606)=0.06$ $\mu$m. Also, from equation (22), modulation part R of channel resistance is $R=2.08/\Delta d=2.08/(0.06\times10^{-14})=3.47\times10^5$ [$\Omega$]. Modulation part of current of the FET $\Delta I$ is related with the drain applied voltage $V_D$ as follows:

$$V_D=\Delta I\cdot R \quad (25)$$

From equation (25), $\Delta I=1/(3.47\times10^5)=2.88\times10^{-6}$ [A]. This value is in a good agreement with $2.96\times10^{-6}$ [A] derived from equation (20). Calculating a current modulation factor per hole from these both values results in 70 pA/hole, which is close to that provided by the charge modulation device (CMD).

When photodiode current is directly read in a DC fashion in non-accumulation mode, a resulting current is an extremely small one as small as $3.2\times10^6\times0.78\times1.6\times10^{-19}=0.4$ pA. In contrast, if the FET is used to read current in accumulation mode, a current of approximately $2.9\times10^{-6}$ A flows as already described, and an amplification factor is $2.9\times10^{-6}/0.4\times10^{-12}=7.3\times10^6$ times, which is very large.

In the first embodiment as already discussed, an extremely large current is obtained compared to the method in which the photodiode is used to directly read a photocurrent in non-accumulation mode. The FET has non-destructive readout capability permitting photocurrent monitoring.

Furthermore, the cantilever 7 is constructed of the n-type semiconductor portion 1 and its exposed area of the n-type semiconductor portion 1 is in an electron accumulated state unlike the prior art. This arrangement substantially lowers dark current, thereby achieving an improved S/N ratio of the integrated SPM sensor.

To reduce interface charge or interface level, plane (1,0,0) or plane (5,1,1) is preferred as Miller indices plane of n-type semiconductor portion. When the n-type semiconductor of such Miller indices plane is used, the depletion layer on and near the surface of the p+ type diffusion layer is minimized. Even if the p+ type diffusion layer is put into depletion state, on its surface and in the vicinity of its surface, the generation of dark current is kept to a minimum.

The first embodiment employs the n-channel FET. Alternatively, a p-channel FET is constructed by reversing the type of the impurity and reversing the polarity of the applied bias. In this case, however, it is important that p+ type diffusion layer be formed on the surface of the p-type semiconductor portion, except on the functional portions such as source, drain, gate and the like to reduce dark current.

The second embodiment of the present invention is now discussed. The object of the second embodiment is to enhance the sensitivity of the tip of the embodiment even further. FIG. 16 shows the cross section of the tip of the second embodiment. In the first embodiment in FIG. 13A, the p+ type diffusion layer 5 is extended to the point of the tip 6. In this embodiment, however, a p+ type diffusion layer 5-1 is disposed on the surface of the tip except the tip top portion 6a of the tip 6 as shown in FIG. 16.

By leaving the tip top portion 6a of the tip 6 clear of the p+ type diffusion layer 5-1, the tip top portion 6a that is also a light receiving area is put into depletion state with the p+ type diffusion layer 5-1 reverse biased. Namely, the tip up to its top works as an effective photoelectric conversion region. Thus, the integrated SPM sensor has an excellent sensitivity against incident light, such as blue light, having a short wavelength and having an absorption length being very short in semiconductor.

FIG. 17 shows the alternate example of the second embodiment. In this alternate example, the tip has a frustum configuration with its top flat portion 6b having no p+ type diffusion layer 5-2. In principle, the operation and advantage of the alternate example remain unchanged from those of the second embodiment shown in FIG. 16. This alternate example, however, has a larger light receiving area on the tip top compared to the second embodiment. An aperture ratio is increased and the sensitivity of the sensor is further improved.

The second embodiment and its alternate example in FIGS. 16 and 17 have a smaller area of the p+ type diffusion layer compared to the first embodiment, and therefore have a higher sensitivity. In the second embodiment and its alternate example, an insulating layer that satisfies the nonreflective condition may be additionally formed on top of the tip surface. By reversing the type of the impurity and by reversing the polarity of the applied voltage, a p-channel FET may be constructed.

The third embodiment of the present invention is now discussed. The third embodiment has a structure that reduces nose associated with the entry of stray light. FIG. 18 shows the cross section of the device of the third embodiment. As shown, in comparison with the first embodiment, the third embodiment has additionally a light-shielding layer 20 of metal such as aluminum on the p+ type diffusion layer 5, except the tip top portion 6a of the tip 6.

The light-shielding layer 20 reflects back unwanted stray light 21 that could otherwise enter through the area other than the tip top portion 6a of the tip 6, and thus makes it impossible for such unwanted light to reach the n-type semiconductor portion 1. Thus, such unwanted light is prevented from contributing to photoelectric conversion. As a result, noise component in the photodetector is reduced, and an improved S/N ratio results.

If the insulating layer that satisfies the nonreflective condition is incorporated, it may be disposed either on top of the light-shielding layer or beneath the light-shielding layer. Again, by reversing the type of the impurity and by reversing the polarity of the applied voltage, a p-channel FET may be constructed. The light-shielding layer 20 may be additionally disposed to the second embodiment and its alternate example shown respectively in FIGS. 16 and 17.

Figure 19:
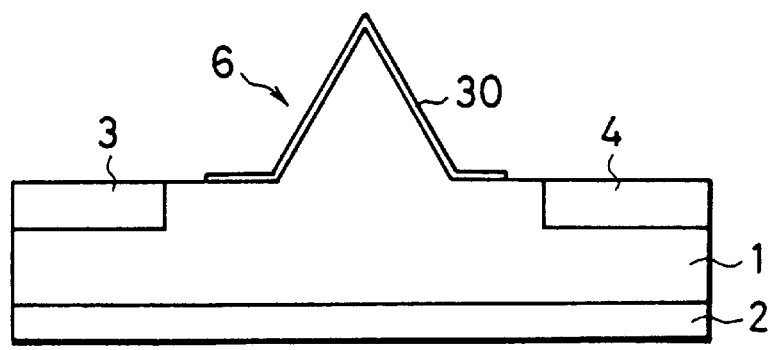
FIG. 19 is a cross-sectional view showing a fourth embodiment of the present invention.

The fourth embodiment of the present invention is now discussed. The fourth embodiment employs a Schottky gate type photo FET as its photodetector. The preceding first through third embodiments employ as a photodetector a photo FET having a junction diode structure made of p+ type diffusion layer. In this embodiment, a Schottky diode structure is formed in the photo FET gate section. FIG. 19 shows its cross section. The difference from the first embodiment shown in FIGS. 13A through 13D, is that a metal electrode 30 is substituted for the p+ type diffusion layer 5 in the gate section with no p+ type diffusion layer 5 used. When monocrystalline silicon is used as semiconductor as already described with reference to the first embodiment, gold, aluminum, molybdenum, titanium and the like are candidate materials as the metal electrode 30 that constitutes the Schottky diode. The metal electrode 30 has a thin film structure as thin as or thinner than several hundred Å so that incident light may pass through the top portion of the tip 6. The operation and the remaining structure of the fourth embodiment remain unchanged from those of the first embodiment, and thus the discussion for it is not repeated.

The fourth embodiment has the advantage that, compared with the first embodiment, the thickness of the n-type semiconductor portion 1 is set to be wide enough to expand the effective photoelectric conversion region, because the p+ type diffusion layer 5 having a thickness of $t_{p+}$ is not contained.

Figure 20:
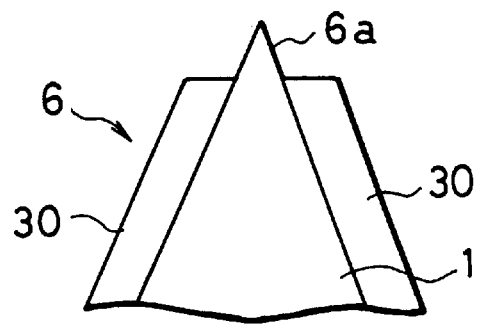
FIG. 20 is a cross-sectional view of the tip according an alternate example of the fourth embodiment.
Figure 21:
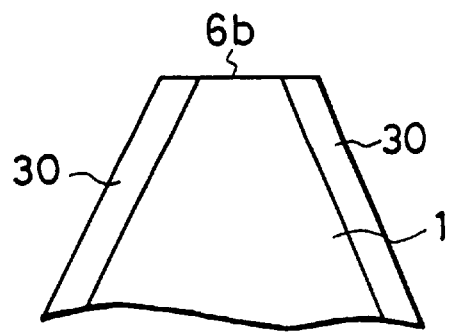
FIG. 21 is a cross-sectional view of the tip according to another alternate example of the fourth embodiment.

In a similar way the alternate examples have been contemplated in the second embodiment, the top portion 6a of the tip 6 and the top flat portion 6b of the frustum tip 6 may designed to be clear of the metal electrode 30 in alternate examples of the fourth embodiment. In this case, the alternate examples may also function as a Schottky structure. The alternate examples of the fourth embodiment are shown in FIGS. 20 and 21, correspondingly to the second embodiment and its alternate examples in FIGS. 16 and 17. The operation and advantage of the top portion 6a or top flat portion 6b clear of the metal electrode 30 remain the same as those of the second embodiment and its alternate examples, and their discussion is not repeated herein.

In the alternate examples of the fourth embodiment in FIGS. 20 and 21, the metal electrode 30 does not require such a thin structure as the fourth embodiment does. Conversely, if a metal electrode of several thousand Å thick is formed for light not to pass therethrough in the alternate examples in FIGS. 20 and 21, the resulting stray light blocking effect advantageously achieves an improved S/N ratio as in the third embodiment shown in FIG. 18.

In the fourth embodiment and its alternate examples, again, a nonreflective layer may be formed on top of the metal electrode 30, or at least on the top portion 6a or flat top portion 6b of the tip 6. In the fourth embodiment shown in FIG. 19, however, when setting conditions of the nonreflective layer, the refractive index of the metal electrode 30 against the incident light of wavelength λ is substituted for the refractive index of the n-type semiconductor portion 1. The p++ type diffusion layer 2 may be replaced with a Schottky junction as in the first embodiment. This is equally applicable to the second and third embodiments.

Figure 22:
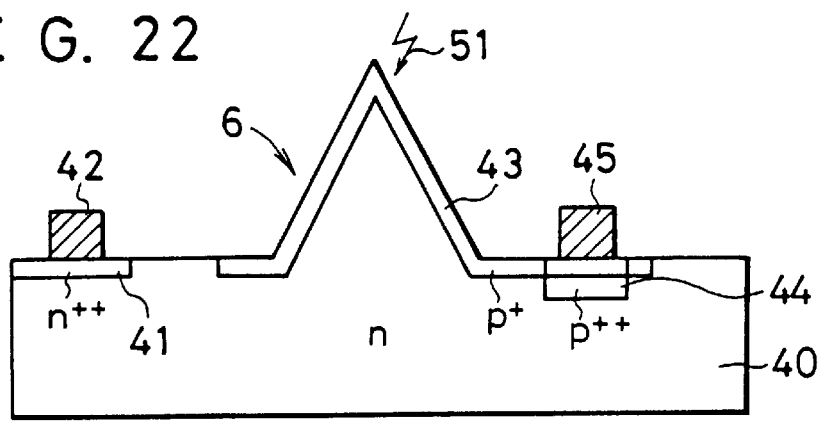
FIG. 22 is a cross-sectional view showing a fifth embodiment of the present invention.

The fifth embodiment of the present invention is now discussed. This embodiment employs a photodiode structure as a photodetector. FIG. 22 shows the cross section of the fifth embodiment having a pn junction photodiode as a photodetector. Shown in FIG. 22 are an n-type semiconductor portion 40 and an n++ type diffusion layer 41 to give potential to the n-type semiconductor portion 40. A wiring 42 made of, for example, aluminum is connected to the n++ type diffusion layer 41. The dimensions, impurity concentrations, and configurations of the n-type semiconductor portion 40, n++ type diffusion layer 41, and metal wiring 42 remain unchanged from those in the first embodiment. Designated 43 is a p+ type diffusion layer formed on top of the tip 6, correspondingly to the p+ type diffusion layer 5 in the first embodiment. The diffusion depth and impurity concentration of the p+ type diffusion layer 43 are identical to those of the p+ type diffusion layer 5 in the first embodiment. Designated 45 is a metal wiring for giving potential to the p+ type diffusion layer 43. When a low surface concentration of the p+ type diffusion layer 43 makes it difficult to establish an ohmic contact with the metal wiring 45, a p++ type diffusion layer 44 is formed. The p++ type diffusion layer 44 has preferably a surface concentration of $1\times10^{19}$ cm$^{-3}$ or more and a diffusion depth of 0.5 μm or so.

The operation of the fifth embodiment thus constructed is now discussed. A voltage is applied across the metal wirings 42, 45 so that p+n junction is reverse biased. Specifically, the voltage is applied so that the metal wiring 45 is set to be negative relative to the wiring 42. Under this condition, when an incident light 51 enters through the top of the tip 6, hole-electron pairs are generated in the n-type semiconductor portion 40. Holes flow to the p+ type diffusion layer 43, while electrons flow to the n++ type diffusion layer 41. With the reverse bias voltage applied between the metal wirings 42, 45 in a DC manner, a photocurrent proportional to the light quantity of the incident light 51 flows. Alternatively, accumulation and readout modes may be incorporated as follows: one of the metal wirings 42, 45 may be set to be floating during photoelectric charge accumulation time. During signal readout time, one of the wirings that was floating is electrically connected back to read accumulated photocarriers in a pulse current.

Since the cantilever is constructed of the n-type semiconductor portion 40 in the fifth embodiment, the reduction of dark current is possible as in the first embodiment. Thus, an integrated SPM sensor with a substantially improved S/N ratio results.

In the fifth embodiment, a metal light-shielding layer may be additionally formed on the inclined surface of the tip to achieve an improved S/N ratio as in the third embodiment shown in FIG. 18.

Figure 23:
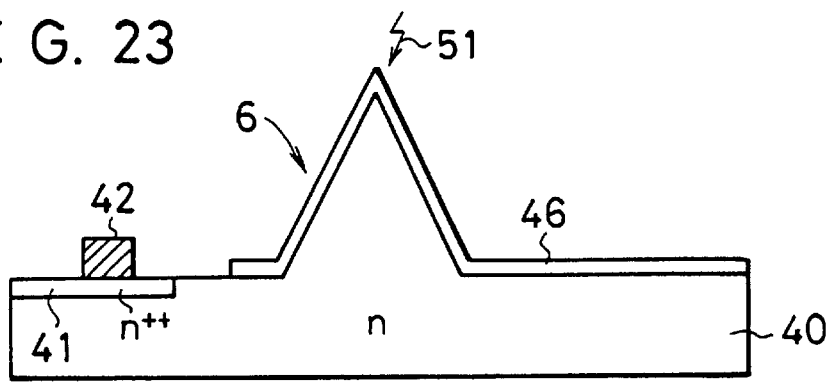
FIG. 23 is a cross-sectional view according to an alternate example of the fifth embodiment.

An alternative example of the fifth embodiment is now discussed referring to FIG. 23. The alternative example employs as a photodetector a photodiode having a Schottky junction structure. In FIG. 23, designated 46 is a metal electrode that forms a Schottky junction. The material and thickness of the metal electrode 46 are identical to those of the metal electrode 30 in the fourth embodiment, and the discussion for it is not repeated herein.

The operation of the alternate example of the fifth embodiment is now discussed. A reverse bias voltage is applied between the metal wiring 42 and metal electrode 46. Under this condition, when an incident light 51 enters, hole-electron pairs are generated in the n-type semiconductor portion 40. Electrons flow out to the metal wiring 42, while holes flow out to the metal electrode 46. As a result, a photocurrent proportional to the light quantity of the incident light 51 flows across the metal wiring 42 and metal electrode 46. Light intensity may be determined by picking up this photocurrent value.

Figure 24:
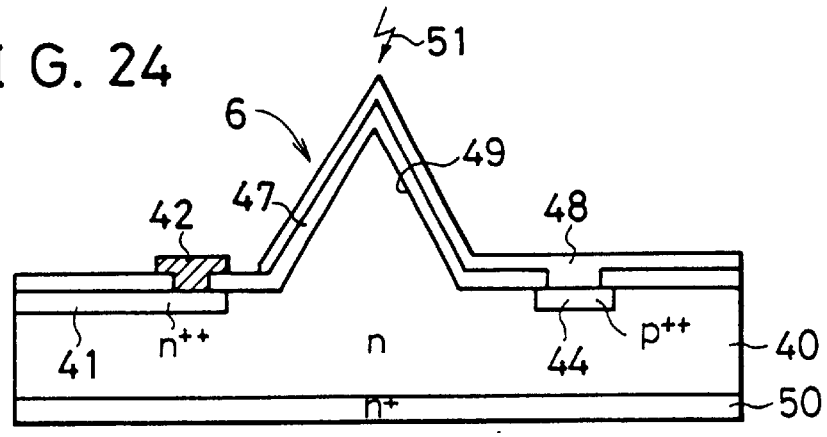
FIG. 24 is a cross-sectional view showing another alternate example of the fifth embodiment.

Another alternate example of the fifth embodiment is now discussed referring to FIG. 24. This alternate example employs as a photodetector an MOS type photodiode. Designated 47 in FIG. 24 is a gate insulating layer of SiO$_2$ or the like. A gate electrode 48 of polycrystal silicon keeps an ohmic contact with the p++ type diffusion layer 44. Namely, the conductivity type of the gate electrode 48 of polycrystal silicon is preferably p-type.

The operation of the alternate example is now discussed. With the metal wiring 42 at 0 V, a bias voltage is applied to the gate electrode 48 so that the interface 49 of the gate insulating layer 47 is in a inversion condition. When the n-type semiconductor portion 40 has an impurity concentration of $1\times10^{15}$ cm$^{-3}$, $-2$ V to the gate electrode 48 is sufficient enough. Under this condition, an inversion layer of holes is formed in the interface 49.

When an incident light 51 enters the top of the tip 6, hole-electron pairs are generated in the n-type semiconductor portion 40. Electrons flow out to the metal wiring 42, while holes flow to the p++ type diffusion layer 44 via the inversion layer of the interface 49. Light quantity may be determined by picking up the photocurrent that flows between the metal wiring 42 and the gate electrode 48.

The thicknesses of the gate insulating layer 47 and gate electrode 48 are set to optimum respective values that satisfy the nonreflective condition determined by the wavelength λ of the incident light 51. The calculation of multiple interference shows that, when λ=550 nm, for example, an appropriate thickness of the gate electrode 48 of polycrystal silicon is between 600 Å and 800 Å and an appropriate thickness of the gate insulating layer 47 of SiO$_2$ is thinner than 400 Å or between 1400 Å and 1600 Å.

The basic structure and operation of three types of photodiode structured photodetector have been discussed. Structures employed in the second and fourth embodiments may be applied to the fifth embodiment and its alternate examples as well to achieve an even more improved sensitivity: specifically, the p+ type diffusion layer 43 on the tip 6 in the fifth embodiment in FIG. 22, the Schottky metal electrode 46 on the tip 6 in the first alternate example of the fifth embodiment in FIG. 23, and the gate electrode 48 and gate insulating layer 47 on the tip 6 in the second alternate example of the fifth embodiment in FIG. 24 are removed.

In the fifth embodiment and its alternate examples, an insulating layer transparent to the incident light and meeting the nonreflective condition may be disposed on top of the tip.

As shown in one of the alternate example in FIG. 24, an n+ type diffusion layer 50 on the bottom side, namely opposite side from the tip may be disposed. The potential of the n+ type diffusion layer 50 is provided by the n++ type diffusion layer 41 via the n-type semiconductor portion 40. Thus, no particular electrode is required. In this case, even when the diode structure is biased strongly enough for the depletion layer to reach the bottom side, the extension of the depletion layer is blocked by the presence of the n+ type diffusion layer 50. The bottom side is thus prevented from being put into depletion state, and an increase in dark current due to the presence of interface level is thus advantageously avoided. The provision of the n+ type diffusion layer 50 on the bottom side may be applied to the fifth embodiment in FIG. 22 and its alternative example in FIG. 23.

A photodiode of opposite type may be constructed by reversing the type of the impurity and the polarity of applied voltage in the fifth embodiment and its alternate examples.

Although, from the sensitivity standpoint, the photodiode in the fifth embodiment is outperformed by the photo FETs in the first through fourth embodiments, it has the advantage that the photo FETs do not have. Specifically, when the photodiode structure receives both a tunneling current and an optical signal, the photocurrent flows to the n++ type diffusion layer 41 and the other electrode in FIGS. 22 through 24. The tunneling current flows to the other electrode only. This suggests that the optical signal is picked up by reading the current flowing through the n++ type diffusion layer 41. Furthermore, the tunneling current is detected by subtracting the current flowing through the n++ type diffusion layer 41 from the current flowing to the other electrode. By employing the diode structure as the photodetector, the integrated SPM sensor can detect simultaneously both tunneling current and optical signal, though with its inherent two-terminal structure.

The integrated SPM sensor with the cantilever having the photodetector in each of the preceding embodiments will achieve an even more improved S/N ratio if the integrated SPM sensor is cooled to lower dark current during use.

Figure 25A:
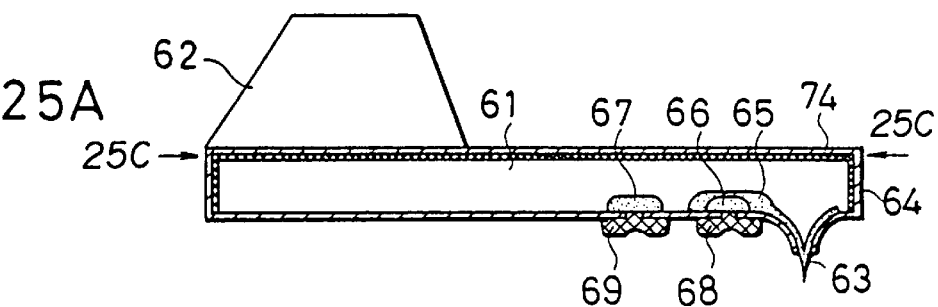
FIG. 25A is a cross-sectional view showing the integrated SPM sensor according to a sixth embodiment of the present invention.
Figure 25B:
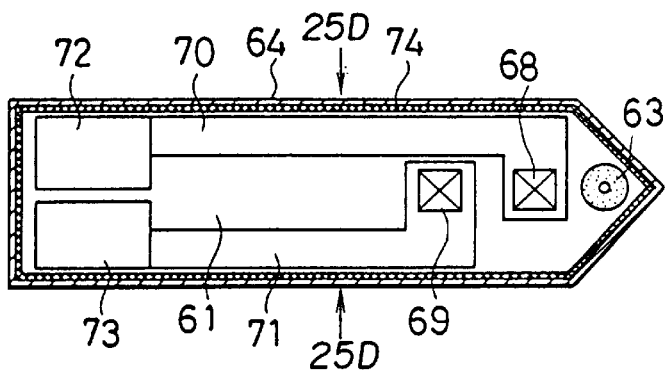
FIG. 25B is a plan view of the integrated SPM sensor of FIG. 25A.
Figure 25C:
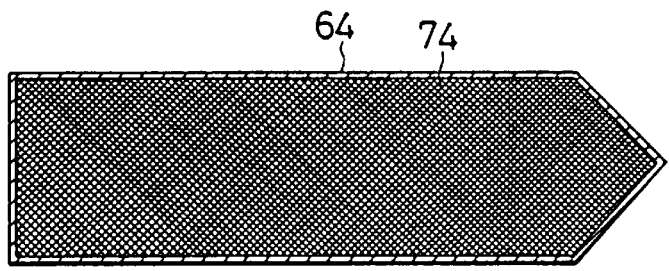
FIG. 25C is a cross-sectional view taken along the line 25C—25C in FIG. 25A.
Figure 25D:
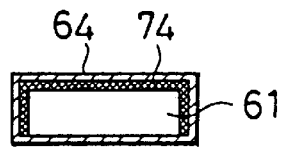
FIG. 25D is a cross-sectional view taken along the line 25D—25D in FIG. 25B.

The sixth embodiment of the present invention is now discussed. FIG. 25A is the vertical cross-sectional view of the sixth embodiment. FIG. 25B is the top plan view of the sensor probe side of the sensor. FIG. 25C is the crosssectional view taken along the arrow 25C—25C in FIG. 25A. FIG. 25D is the cross-sectional view taken along the arrow 25D—25D in FIG. 25B. The integrated SPM sensor in this embodiment has a probe (tip) 63 at the end of the n-type silicon based cantilever 61 extended from its supporting base 62. A p+ type silicon layer 65 covers the probe 63 and its vicinity. The p+ type silicon layer 65 is connected to an electrode 68 made of aluminum or the like via a p++ type silicon layer 66 and a contact hole. A n++ type silicon layer 67 is formed on the cantilever 61, 10 μm away from the end of the p+ type silicon layer 65. The n++ type silicon layer 67 is connected to an electrode 69 made of aluminum or the like via a contact hole.

The electrodes 68, 69 are connected to respective aluminum pads 72, 73 via respective aluminum wirings 70, 71. A heavily n+ type doped diffusion layer 74 of $1\times10^{19}$ cm$^{-3}$ concentration is integrally formed on the surrounding edges and the bottom surface of the cantilever 61. The cantilever 61 is entirely covered with silicon oxide film 64 except the contact holes and the end portion of the probe 63. The p++ type silicon layer 66 and n++ type silicon layer 67 are provided to establish, respectively, an ohmic contact between the electrode 68 and the p+ type silicon layer 65 and an ohmic contact between the electrode 69 and the n-type silicon substrate that forms the cantilever 61. The p++ type silicon layer 66 and n++ type silicon layer 67 are not necessarily required if the p+ type silicon layer 65 and the n-type silicon substrate have a concentration high enough to establish ohmic contact on themselves.

The operation of the integrated cantilever thus constructed is now discussed. During use, a reverse bias voltage of 3 to 4 V is applied between the electrodes 68 and 69. The p+ type silicon layer 65 and n-type silicon substrate (cantilever 61) between the electrodes 68, 69 form a pn photodiode. Flowing between the electrodes 68 and 69 is a current proportional to the light quantity of the incident light to the probe 63 formed of the p+ type silicon layer 65. The current is picked up via the wirings 70, 71 and the pads 72, 73. In this case, hole-electron pairs that take place on the surface other than the probe 63 and electrodes 68, 69 of the cantilever 61 are immediately captured and then recombine in the heavily doped diffusion layer 74. They are thus prevented from contributing to dark current in the cantilever. The integrated SPM sensor in this embodiment thus controls the generation of dark current, and thereby permits low-noise and high-sensitivity SNOM measurements.

Figure 26:
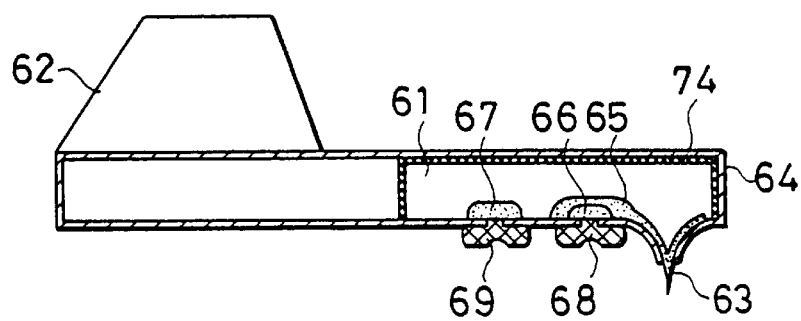
FIG. 26 is a cross-sectional view showing an alternate example of the sixth embodiment shown in FIGS. 25A through 25D.
Figure 27A:
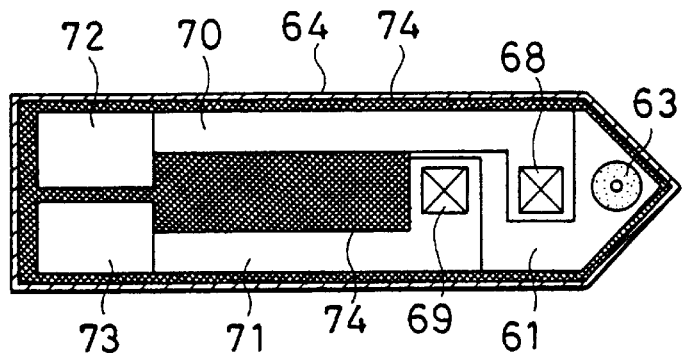
FIGS. 27A and 27B are plan and cross-sectional views showing another alternate example of the sixth embodiment shown in FIGS. 25A through 25D.
Figure 27B:
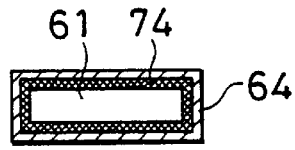

In the sixth embodiment, the heavily-doped diffusion layer 74 is disposed on the bottom surface and edges of the cantilever. Alternatively, as shown in FIG. 26, the heavily doped diffusion layer 74 may be disposed inside the cantilever 61 if a sufficient distance is allowed to the p++ type silicon layer 66 and n++ type silicon layer 67. In the sixth embodiment, the heavily doped diffusion layer 74 is not formed on the probe side surface of the cantilever 61. Alternatively, as shown in the plan view in FIG. 27A and the cross-sectional view in FIG. 27B, the heavily doped diffusion layer 74 is formed on the probe side surface as well, except on the formations of the p++ type silicon layer 66 and n++ type silicon layer 67.

Figure 28:
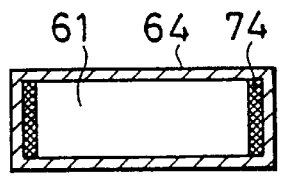
FIG. 28 is a cross-sectional view showing yet another alternate example of the sixth embodiment shown in FIGS. 25A through 25D.

Since the probe side surface and bottom side surface of the cantilever 61 are smooth, the generation rate of dark current on these areas is small compared with the side surfaces of the cantilever. As shown in FIG. 28, the probe side and bottom side surfaces are clear of the heavily doped diffusion layer. The heavily-doped diffusion layer is disposed on the side surfaces only with still considerable effect in controlling dark current.

Figure 29A:
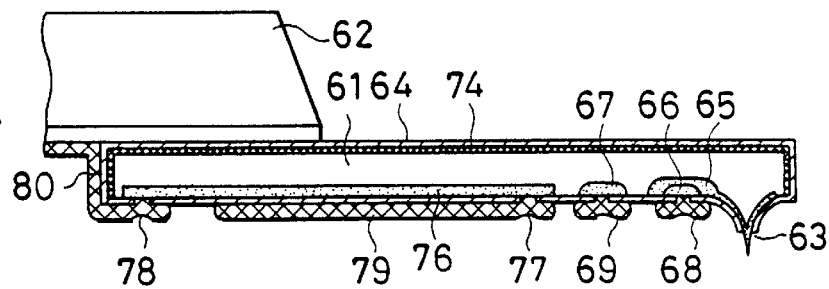
FIGS. 29A and 29B are cross-sectional and plan views showing a seventh embodiment of the present invention.
Figure 29B:
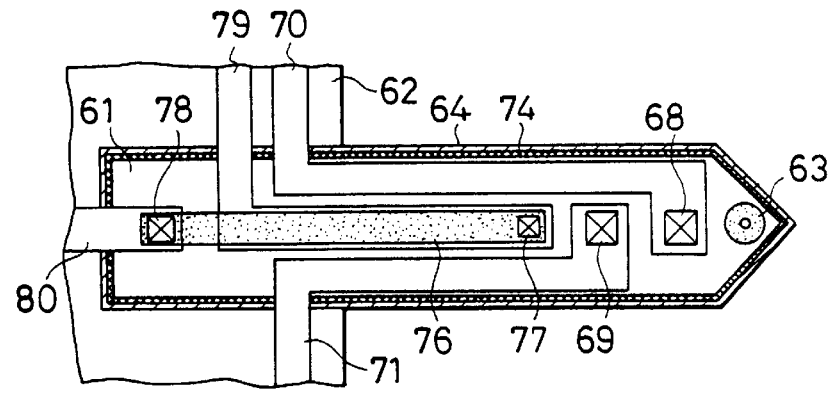

The seventh embodiment of the present invention is now discussed. FIG. 29A is the cross-sectional view of the seventh embodiment. FIG. 29B is a plan view of the probe side of the cantilever with certain parts omitted. This embodiment contains a piezoresistive element 76 as a strain detector on the cantilever 61 in the integrated SPM sensor so that both AFM and SNOM measurements are simultaneously performed. The piezoresistive element 76 has on its both ends aluminum pads 77, 78 to which aluminum wirings 79, 80 are connected to detect a change in current to measure strain. The heavily doped diffusion layer 74 is formed on the surfaces of the cantilever 61 except the probe side surface.

Since the strain detector constructed of the piezoresistive element 76 is a physical quantity to current converting sensor element, it is equally affected by dark current as the photodetector is. By forming the heavily doped diffusion layer on the surface of the cantilever except its probe side surface, the photodetector element and the strain detector element are set free of dark current effect. Thus, the SPM sensor permits simultaneously a high-sensitivity SNOM measurement and a low-noise, high-sensitivity AFM measurement.

Figure 30A:
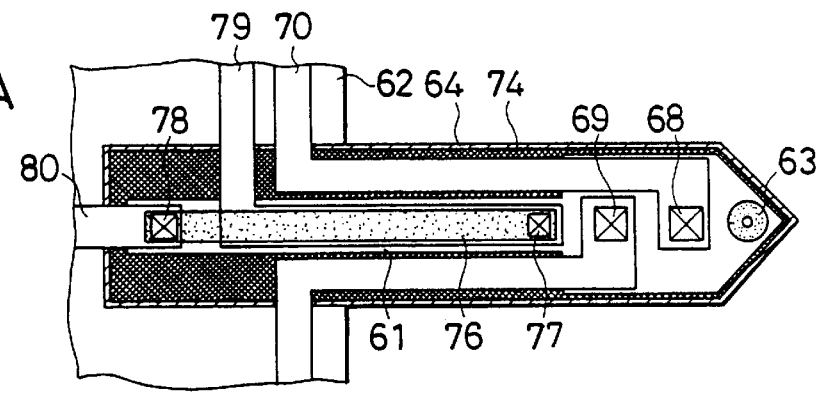
FIGS. 30A and 30B are plan and cross-sectional views showing an alternate example of the seventh embodiment shown in FIGS. 29A and 29B.
Figure 30B:
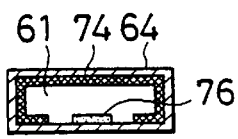

In this embodiment, the probe side surface of the cantilever 61 is clear of the heavily-doped diffusion layer 74. Alternatively, however, as shown in the plan view in FIG. 30A and the cross-sectional view in FIG. 30B, the heavily doped diffusion layer 74 is also formed on the probe side surface of the cantilever 61 in a manner that the formations of the piezoresistive element 76 and the photodetector are surrounded.

Figure 31A:
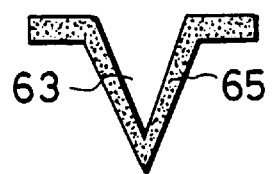
FIGS. 31A through 31D show the structures of probes of the six and seventh embodiments.

As shown in the enlarged view in FIG. 31A, the probe 63 has its p+ type silicon layer 65 extended all the way to its end in the sixth and seventh embodiments.

Figure 31B:
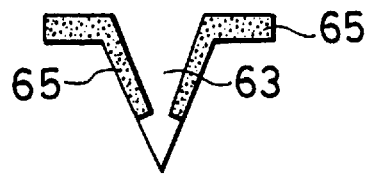
Figure 31C:
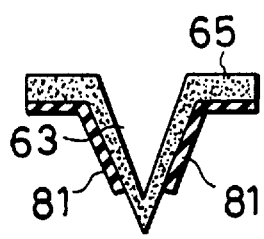
Figure 31D:
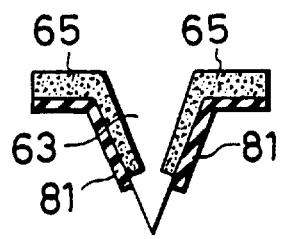

Alternatively, however, the end portion of the probe 63 is formed of n-type silicon layer rather as shown in FIG. 31B than the p+ type silicon layer 65. Furthermore, a light-shielding layer 81 made of aluminum or the like is disposed on the probe except its end portion to block incident light there as shown in FIGS. 31C and 31D.

In the sixth and seventh embodiments, the cantilever has a generally I-shaped configuration. The sixth and seventh embodiments may also be applied to the integrated SPM sensor having a generally U-shaped or E-shaped cantilever.

The sixth and seventh embodiments employ an n-type silicon based cantilever. Alternatively, however, a p-type silicon based cantilever may be used. In this case, conductivity type is also reversed between p+ type silicon layer and n+ type silicon layer, and p++ type silicon layer and n++ type silicon layer.

A piezoresistive element may be incorporated in the integrated SPM sensor of any of the first through fifth embodiments so that strain detection may be performed along with an SNOM measurement.

Also applied to the sixth and seventh embodiments are arrangements implemented in the first through fifth embodiments, said arrangements including disposing on the photodetector a thin layer that satisfies the nonreflective condition, setting the thickness of the insensitive region of the photodetector to the incident light to be half the absorption length of the incident light, setting the thickness of the photoelectric conversion region of the photodetector to be as equal to or greater than twice the absorption length of the incident light, and removing the end portion of the insensitive region of the photodetector to the incident light.

Since as already described, according to the present invention, the probe is constructed of the photodetector of any of a junction gate type photo FET, Schottky gate type photo FET, MOS type photodiode, and Schottky type photodiode, a resulting compact integrated SPM sensor easily detects a weak light such as evanescent light. According to the present invention, furthermore, the sensitivity increase and noise reduction are achieved by improving elementary structures of the photodetector of the integrated SPM sensor and by amplifying a detected signal. According to the present invention, thermally excited dark current is substantially reduced and an integrated SPM sensor with an improved S/N ratio results by constructing the cantilever and its supporting base of the n-type semiconductor substrate. The S/N ratio may be improved at optimum conditions by setting the concentration of the n-type semiconductor substrate forming the cantilever and its supporting base to be between $1\times10^{14}$ cm$^{-3}$ and $1\times10^{17}$ cm$^{-3}$. According to the present invention, the integrated SPM sensor permits SNOM or AFM measurement at a high sensitivity and with dark current effect eliminated. According to the present invention, the integrated SPM sensor simultaneously performs two or more types of measurements, including SNOM and AFM measurements, at a high sensitivity and with dark current effect virtually eliminated.

What is claimed is:

1. An integrated SPM sensor, comprising:
   a cantilever constructed of an n-type semiconductor and having a probe on a free end of the cantilever;
   a supporting base constructed of an n-type semiconductor for supporting a fixed end of the cantilever;
   a photodetector mounted on the probe; and
   signal lines for conducting a signal picked up by the photodetector,
   wherein a tip portion of a region insensitive to an incident light and existing in a top portion of a photoelectric conversion region of said photodetector mounted on the probe is set to be equal to or less than approximately half an absorption length of an incident light.

2. An integrated SPM sensor, comprising:
   a cantilever constructed of an n-type semiconductor and having a probe on a free end of the cantilever;
   a supporting base constructed of an n-type semiconductor for supporting a fixed end of the cantilever;
   a photodetector mounted on the probe; and
   signal lines for conducting a signal picked up by photodetector;
   wherein a thickness of a photoelectric conversion region of said photodetector mounted on the probe is set to be equal to or greater than approximately twice an absorption length of an incident light.

3. An integrated SPM sensor, comprising:
   a cantilever constructed of an n-type semiconductor and having a probe on a free end of the cantilever;
   a supporting base constructed of an n-type semiconductor for supporting a fixed end of the cantilever;
   a photodetector mounted on the probe; and
   signal lines for conducting a signal picked up by the photodetector, wherein a tip portion of a region insensitive to an incident light and existing in a top portion of a photoelectric conversion region of said photodetector mounted on the probe is removed.

4. An integrated SPM sensor comprising:
a cantilever constructed of a semiconductor and having a probe on a free end of the cantilever;
a heavily-doled diffusion layer formed at least on side surfaces other than a surface on which a probe is formed of the cantilever and a rear surface thereof;
a supporting base for supporting a fixed end of the cantilever; and
a physical quantity-to-current converting sensor mounted on the cantilever.

5. The integrated SPM sensor according to claim 4, wherein said heavily-doped diffusion layer surrounds said physical quantity-to-current converting sensor.

6. The integrated SPM sensor according to any of claims 4 and 5, wherein said physical quantity-to-current converting sensor is a semiconductor photodetector in a vicinity of the probe in the cantilever.

7. The integrated SPM sensor according to claim 6, wherein said semiconductor photodetector is provided, on its surface, with a thin layer transparent to an incident light and meeting substantially a nonreflective condition.

8. The integrated SPM sensor according to claim 6, wherein a thickness of a region insensitive to an incident light and existing in a top portion of a photoelectric conversion region of said semiconductor photodetector is set to be equal to or smaller than approximately half an absorption length of the incident light.

9. The integrated SPM sensor according to claim 6, wherein a thickness of a photoelectric conversion region of said semiconductor photodetector is set to be equal to or greater than approximately twice an absorption length of an incident light.

10. The integrated SPM sensor according to claim 6, wherein a tip portion of a region insensitive to an incident light and existing in a top portion of a photoelectric conversion region of said semiconductor photodetector is removed.

11. The integrated SPM sensor according to any of claims 4 and 5, wherein said physical quantity-to-current converting sensor is a strain detector.

12. The integrated SPM sensor according to any of claims 4 and 5, wherein said physical quantity-to-current converting sensor comprises two or more different detectors.

13. The integrated SPM sensor according to claim 12, wherein said physical quantity-to-current converting sensor comprises a semiconductor photodetector mounted in a vicinity of the probe of the cantilever and a strain detector mounted on the cantilever.

14. The integrated SPM sensor according to claim 13, wherein said semiconductor photodetector is provided, on its surface, with a thin layer transparent to an incident light and is substantially nonreflective.

15. The integrated SPM sensor according to claim 13, wherein a thickness of a region insensitive to an incident light and existing in a top portion of a photoelectric conversion region of said semiconductor photodetector is set to be equal to or smaller than approximately half an absorption length of the incident light.

16. The integrated SPM sensor according to claim 13, wherein a thickness of a photoelectric conversion region of said semiconductor photodetector is set to be equal to or greater than approximately twice an absorption length of an incident light.

17. The integrated SPM sensor according to claim 13, wherein a tip portion of a region insensitive to an incident light and existing in a top portion of a photoelectric conversion region of said semiconductor photodetector is removed.

18. An integrated SPM sensor, comprising:
a probe constructed of a photodetector of a junction gate-type photo FET;
a cantilever having said probe on a free end of the cantilever;
a supporting base for supporting a fixed end of the cantilever; and
signal lines for conducting a signal picked up by said probe;
wherein a thickness of a region insensitive to an incident light and existing in a top portion of a photoelectric conversion region of said photodetector forming the probe is set to be equal to or less than approximately half an absorption length of the incident light.

19. An integrated SPM sensor, comprising:
a probe constructed of a photodetector of a junction gate-type photo FET;
a cantilever having said probe on a free end of the cantilever;
a supporting base for supporting a fixed end of the cantilever;
signal lines for conducting a signal picked up by said probe; and
wherein a thickness of a photoelectric conversion region of said photodetector forming the probe is set to be equal to or greater than approximately twice an absorption length of an incident light.

20. An integrated SPM sensor, comprising:
a probe constructed of a photodetector of a function gate-type photo FET;
a cantilever having said probe on a free end of the cantilever;
a supporting base for supporting a fixed end of the cantilever; and
signal lines for conducting a signal picked up by said probe;
wherein a tip portion of a region insensitive to an incident light and existing in a top portion of a photoelectric conversion region of said photodetector forming the probe is removed.

21. An integrated SPM sensor, comprising:
a probe constructed of a photodetector of a Schottky gate-type photo FET;
a cantilever having said probe on a free end of the cantilever;
a supporting base for supporting the cantilever on a fixed end of the cantilever; and
signal lines for conducting a signal picked up by said probe;
wherein a thickness of a region insensitive to an incident light and existing in a top portion of a photoelectric conversion region of said photodetector forming the probe is set to be equal to or less than approximately half an absorption length of the incident light.

22. An integrated SPM sensor, comprising:
a probe constructed of a photodetector of an MOS type photodiode;
a cantilever having said probe on a free end of the cantilever;

a supporting base for supporting a fixed end of the cantilever; and signal lines for conducting a signal picked up by said probe;

wherein a thickness of a region insensitive to an incident light and existing in a top portion of a photoelectric conversion region of said photodetector forming the probe is set to be equal to or less than approximately half an absorption length of the incident light.

23. An integrated SPM sensor, comprising:

a probe constructed of a photodetector of a Schottky type photodiode;

a cantilever having said probe on a free end of the cantilever;

a supporting base for supporting a fixed end of the cantilever; and signal lines for conducting a signal picked up by said probe;

wherein a thickness of a region insensitive to an incident light and existing in a top portion of a photoelectric conversion region of said photodetector forming the probe is set to be equal to or less than approximately half an absorption length of the incident light.

24. An integrated SPM sensor, comprising:

a probe constructed of a photodetector of a Schottky gate-type photo FET;

a cantilever having said probe on a free end of the cantilever;

a supporting base for supporting the cantilever on a fixed end of the cantilever; and signal lines for conducting a signal picked up by said probe;

wherein a thickness of a photoelectric conversion region of said photodetector forming the probe is set to be equal to or greater than approximately twice an absorption length of the incident light.

25. An integrated SPM sensor, comprising:

a probe constructed of a photodetector of an MOS type photodiode;

a cantilever having said probe on a free end of the cantilever;

a supporting base for supporting a fixed end of the cantilever; and signal lines for conducting a signal picked up by said probe;

wherein a thickness of a photoelectric conversion region of said photodetector forming the probe is set to be equal to or greater than approximately twice an absorption length of the incident light.

26. An integrated SPM sensor, comprising:

a probe constructed of a photodetector of a Schottky type photodiode;

a cantilever having said probe on a free end of the cantilever;

a supporting base for supporting a fixed end of the cantilever; and signal lines for conducting a signal picked up by said probe, wherein a thickness of a photoelectric conversion region of said photodetector forming the probe is set to be equal to or greater than approximately twice an absorption length of the incident light.

27. An integrated SPM sensor, comprising:

a probe constructed of a photodetector of a Schottky gate-type photo FET;

a cantilever having said probe on a free end of the cantilever;

a supporting base for supporting the cantilever on a fixed end of the cantilever; and signal lines for conducting a signal picked up by said probe;

wherein a tip portion of a region insensitive to an incident light and existing in a top portion of a photoelectric conversion region of said photodetector forming the probe is removed.

28. An integrated SPM sensor, comprising:

a probe constructed of a photodetector of an MOS type photodiode;

a cantilever having said probe on a free end of the cantilever;

a supporting base for supporting a fixed end of the cantilever; and signal lines for conducting a signal picked up by said probe, wherein a tip portion of a region insensitive to an incident light and existing in a top portion of a photoelectric conversion region of said photodetector forming the probe is removed.

29. An integrated SPM sensor, comprising:

a probe constructed of a photodetector of a Schottky type photodiode;

a cantilever having said probe on a free end of the cantilever;

a supporting base for supporting a fixed end of the cantilever; and signal lines for conducting a signal picked up by said probe, wherein a tip portion of a region insensitive to an incident light and existing in a top portion of a photoelectric conversion region of said photodetector forming the probe is removed.

* * * * *